US006638424B2

(12) United States Patent
Stever et al.

(10) Patent No.: US 6,638,424 B2
(45) Date of Patent: Oct. 28, 2003

(54) STORMWATER TREATMENT APPARATUS

(75) Inventors: R. Russell Stever, Sparks, NV (US); Ben R. Urbonas, Dencer, CO (US); Jonathan E. Jones, Boulder, CO (US); Andrew Earles, Boulder, CO (US); Edward Scott Sarratt, Reno, NV (US); Eric Richard Schneider, Reno, NV (US); Steven C. Phelps, Reno, NV (US)

(73) Assignee: Jensen Enterprises, Sparks, NV (US)

( * ) Notice: Subject to any disclaimer, the term of this patent is extended or adjusted under 35 U.S.C. 154(b) by 0 days.

(21) Appl. No.: 10/084,837

(22) Filed: Feb. 26, 2002

(65) Prior Publication Data

US 2002/0139736 A1 Oct. 3, 2002

Related U.S. Application Data

(63) Continuation-in-part of application No. 09/487,097, filed on Jan. 19, 2000, now Pat. No. 6,350,374.

(51) Int. Cl.$^7$ .............................. B01D 21/02; B01D 21/24
(52) U.S. Cl. ................... 210/170; 210/521; 210/532.1; 210/534
(58) Field of Search ................................ 210/747, 170, 210/154, 513, 519, 521, 532.1, 533, 534, 800, 121, 242.1; 405/39, 40

(56) References Cited

U.S. PATENT DOCUMENTS

| 255,086 A | 3/1882 | Redmond |
|---|---|---|
| 404,852 A | 6/1889 | Long |
| 1,153,332 A | 9/1915 | Naylor |
| 1,166,802 A | 1/1916 | Albert et al. |
| 1,401,182 A | 12/1921 | Overtojn |
| 1,644,532 A | 10/1927 | Ledyard et al. |
| 1,695,217 A | 12/1928 | Thurell |
| 1,812,401 A | 6/1931 | Goulding |
| 2,058,044 A | 10/1936 | Spencer |
| 2,103,600 A | 12/1937 | Stevens |
| 2,128,569 A | 8/1938 | Velz |
| 2,279,813 A | 4/1942 | Bent |
| 2,782,929 A | 2/1957 | Colket |
| 2,852,140 A | 9/1958 | MaClaren |
| 3,510,001 A | 5/1970 | Bear et al. |

(List continued on next page.)

FOREIGN PATENT DOCUMENTS

| DE | 41 03 349 A | 6/1992 |
|---|---|---|
| DE | 92 06 753 U | 12/1992 |
| DE | 44 10 632 A | 9/1995 |
| DE | 195 47 140 A | 6/1997 |
| FR | 2 342 943 A | 9/1977 |
| GB | 1 433 171 A | 4/1976 |
| WO | PCT/US01/01824 | 7/2001 |

*Primary Examiner*—Duane Smith
*Assistant Examiner*—Frank M. Lawrence
(74) *Attorney, Agent, or Firm*—Knobbe, Martens & Olson & Bear, LLP

(57) ABSTRACT

A liquid purification and separation apparatus for separation of pollutants in stormwater runoff is disclosed. This apparatus utilizes gravitational separation and tortuosity, resulting from a plurality of baffles both perpendicular to and oblique to the primary water flow direction, to trap substances less-dense and more-dense than water. The apparatus features improved resistance to pollutant remobilization through treatment of water volume rather than flow rates, using vertically stacked water columns of varying depths to settle small particles. An overflow structure diverts excessive liquid without interfering with purification and separation, and can be placed integrally within or external to the apparatus receptacle.

18 Claims, 14 Drawing Sheets

U.S. PATENT DOCUMENTS

| | | |
|---|---|---|
| 3,534,859 A | 10/1970 | Amero et al. |
| 3,745,115 A | 7/1973 | Olsen |
| 3,862,040 A * | 1/1975 | Preus et al. .................. 210/253 |
| 3,904,524 A | 9/1975 | Pelton et al. |
| 3,938,713 A | 2/1976 | Pielkenrood |
| 3,951,817 A | 4/1976 | Snyder |
| 3,970,556 A | 7/1976 | Gore |
| 4,104,164 A | 8/1978 | Chelton |
| 4,127,488 A | 11/1978 | Bell et al. |
| 4,136,010 A | 1/1979 | Pilie et al. |
| 4,250,933 A | 2/1981 | Olson |
| 4,261,823 A | 4/1981 | Gallagher et al. |
| RE30,793 E | 11/1981 | Dunkers |
| 4,298,471 A | 11/1981 | Dunkers |
| 4,326,952 A | 4/1982 | Blake |
| 4,328,101 A | 5/1982 | Broden |
| 4,363,731 A | 12/1982 | Filippi |
| 4,377,477 A | 3/1983 | Dunkers |
| 4,378,291 A | 3/1983 | Ward et al. |
| 4,383,922 A | 5/1983 | Beard |
| 4,400,274 A | 8/1983 | Protos |
| 4,447,330 A | 5/1984 | Babineaux, III |
| 4,576,511 A | 3/1986 | Vidal, Jr. |
| 4,664,795 A | 5/1987 | Stegall et al. |
| 4,747,962 A | 5/1988 | Smisson |
| 4,865,751 A | 9/1989 | Smisson |
| 4,886,605 A | 12/1989 | Herve |
| 4,892,440 A | 1/1990 | Regan |
| 4,948,294 A | 8/1990 | Mercier |
| 4,983,295 A | 1/1991 | Lamb et al. |
| 4,985,148 A | 1/1991 | Monteith |
| 4,997,312 A | 3/1991 | Regan |
| 5,004,534 A | 4/1991 | Buzzelli |
| 5,080,137 A | 1/1992 | Adams |
| 5,108,591 A | 4/1992 | Hagan |
| 5,186,821 A | 2/1993 | Murphy |
| 5,216,974 A | 6/1993 | Gordon, Sr. |
| 5,223,154 A | 6/1993 | MacPherson, Jr. et al. |
| 5,228,802 A | 7/1993 | Kuwabara et al. |
| 5,232,307 A | 8/1993 | Nouri |
| 5,232,587 A | 8/1993 | Hegemier et al. |
| 5,249,887 A | 10/1993 | Phillips |
| 5,266,191 A | 11/1993 | Greene et al. |
| 5,298,176 A | 3/1994 | Schloss |
| 5,322,629 A | 6/1994 | Stewart |
| 5,328,609 A | 7/1994 | Magnusson et al. |
| 5,342,144 A | 8/1994 | McCarthy |
| 5,403,474 A | 4/1995 | Emery |
| 5,421,995 A * | 6/1995 | Norcross .................. 210/86 |
| 5,437,786 A | 8/1995 | Horsley et al. |
| 5,478,483 A | 12/1995 | Gore |
| 5,480,254 A | 1/1996 | Autry et al. |
| 5,487,621 A | 1/1996 | Takada et al. |
| 5,498,331 A | 3/1996 | Monteith |
| 5,505,860 A | 4/1996 | Sager |
| 5,520,825 A | 5/1996 | Rice |
| 5,536,409 A | 7/1996 | Dunkers |
| 5,549,817 A | 8/1996 | Horsley et al. |
| 5,554,301 A | 9/1996 | Rippetoe et al. |
| 5,569,372 A | 10/1996 | Smith |
| 5,603,838 A | 2/1997 | Misra et al. |
| 5,605,416 A | 2/1997 | Roach |
| 5,622,448 A | 4/1997 | Baum et al. |
| 5,637,233 A | 6/1997 | Earrusso |
| 5,651,895 A | 7/1997 | Gordon |
| 5,679,258 A | 10/1997 | Petersen |
| 5,679,265 A | 10/1997 | Van Schie |
| 5,702,593 A | 12/1997 | Horsley et al. |
| 5,707,527 A | 1/1998 | Knutson et al. |
| 5,714,069 A | 2/1998 | Sager |
| 5,725,760 A | 3/1998 | Monteith |
| 5,730,878 A | 3/1998 | Rice |
| 5,744,048 A | 4/1998 | Stetler |
| 5,750,033 A | 5/1998 | Ikeda et al. |
| 5,753,115 A | 5/1998 | Monteith |
| 5,759,415 A | 6/1998 | Adams |
| 5,767,060 A | 6/1998 | Hanrahan |
| 5,770,057 A | 6/1998 | Filion |
| 5,779,888 A | 7/1998 | Bennett |
| 5,788,848 A | 8/1998 | Blanche et al. |
| 5,810,510 A | 9/1998 | Urriola |
| 5,820,751 A | 10/1998 | Faircloth, Jr. |
| 5,840,180 A | 11/1998 | Filion |
| 5,890,838 A | 4/1999 | Moore, Jr. et al. |
| 5,909,982 A | 6/1999 | Takada et al. |
| 5,948,266 A | 9/1999 | Gore et al. |
| 5,972,216 A | 10/1999 | Acernese et al. |
| 5,985,157 A | 11/1999 | Leckner et al. |
| 6,027,641 A | 2/2000 | Spradbury et al. |
| 6,077,448 A * | 6/2000 | Tran-Quoc-Nam et al. . 210/790 |
| 6,120,684 A | 9/2000 | Kistner et al. |
| 6,171,507 B1 * | 1/2001 | Roy et al. .................. 210/739 |
| 6,183,633 B1 | 2/2001 | Phillips |
| 6,251,286 B1 | 6/2001 | Gore |
| 6,274,046 B1 | 8/2001 | Lündback |
| 6,277,273 B1 | 8/2001 | Gore et al. |
| 6,428,692 B2 * | 8/2002 | Happel ................. 210/155 |

* cited by examiner

FIG 2: PROFILE VIEW

FIG 3: INLET SECTION 1-1

FIG 4: OUTLET SECTION 2-2

FIG 5: PROFILE VIEW
INLET SECTION DETAIL

FIG 6: PLAN VIEW OUTLET DETAIL

FIG 7: OUTLET ORIFICE DETAIL

FIG 8: BAFFLE SPACING FOR MULTI-SECTION UNITS

STORMWATER TREATMENT APPARATUS

RELATED APPLICATIONS

This application is a continuation-in-part of U.S. patent application Ser. No. 09/487,097, filed Jan. 19, 2000, now U.S. Pat. No. 6,350,374, entitled "Stormwater Treatment Apparatus" and incorporated in its entirety herein by reference.

BACKGROUND OF THE INVENTION

1. Field of the Invention

Apparatus for treatment of stormwater runoff through volume-control-based detention and minimization of pollutant remobilization.

2. Description of the Related Art

This invention relates generally to liquid purification and separation and, more specifically, to an apparatus for separation of pollutants in urban stormwater runoff from the runoff water. This apparatus utilizes gravitational separation and tortuosity, resulting from a plurality of baffles both perpendicular to and oblique to the primary water flow direction, to trap substances less-dense and more-dense than water. This invention is differentiated from prior art by improved resistance to pollutant remobilization, resulting from an iterative experimental hydraulic design process. In addition, this invention provides a degree of retention through volume-control that exceeds that provided by existing gravitational, sub-surface, stormwater treatment systems.

Impacts of stormwater runoff on receiving environments have been documented extensively in engineering and scientific literature. Section 402 of the Federal Clean Water Act (CWA) regulates stormwater discharges through the National Pollutant Discharge Elimination System (NPDES). Treatment of stormwater runoff using best management practices (BMPs) is a typical requirement of state and local regulations, as well. In the 1990s, there has been growing interest in 'ultra-urban/space limited' BMP's, such as sand filters, water quality inlets, and, reservoir/vault type of structures. Space constraints, high property values, soil conditions, and the proximity of other building foundations often preclude the use of conventional, space-intensive stormwater BMP's such as detention ponds. For in-fill construction or redevelopment in built-up urban areas, where pollutant loads from urban runoff are usually the greatest, unconventional stormwater treatment technologies may be necessary.

Vault-type treatment technologies have been widely used for stormwater treatment in urban areas; however, the effectiveness of these devices for removal of suspended solids and oil and grease has been only marginal. A great weakness of these types of devices has been that large storm events tend to flush out the system, thereby releasing pollutants that were previously removed.

Prior art in the field of this invention of which the applicant is aware includes the following:

U.S. Pat. No. 4,127,488, Bell, J. A. et al., November 1978, Method and apparatus for separating solids from liquids.
U.S. Pat. No. 4,136,010, Pilie, R. J. et al., January 1979, Catch basin interceptor.
U.S. Pat. No. 4,328,101, Broden, C. V., May 1982, Device for separating particulate matter from a fluid.
U.S. Pat. No. 4,363,731, Filippi, R., December 1982, Device for regulating the flow of waste waters.
U.S. Pat. No. 4,383,922, Beard, H. J., May 1983, Waste water clarifier.
U.S. Pat. No. 4,983,295, Lamb, T. J. et al., January 1991, Separator.
U.S. Pat. No. 4,985,148, Monteith, J. G., January 1991, Improved separator tank construction.
U.S. Pat. No. 5,004,534, Buzzelli, V., April 1991, Catch basin.
U.S. Pat. No. 5,186,821, Murphy, D. T., February 1993, Wastewater treatment process with cooperating velocity equalization, aeration, and decanting means.
U.S. Pat. No. 5,342,144, McCarthy, E. J., August 1994, Stormwater control system.
U.S. Pat. No. 5,520,825, Rice, W. M., May 1996, Oil-water separator.
U.S. Pat. No. 5,536,409, Dunkers, K. R., July 1996, Water treatment system.
U.S. Pat. No. 5,637,233, Earrusso, P. J., June 1997, Method and apparatus for separating grease from water.
U.S. Pat. No. 5,679,258, Petersen, R. N., October 1997, Mixed immiscible liquids collection, separation, and disposal method and system.
U.S. Pat. No. 5,759,415, Adams, T., June 1998, Method and apparatus for separating floating and non-floating particulate from rainwater drainage.
U.S. Pat. No. 5,788,848, Blanche, P. et al., August 1998, Apparatus and methods for separating solids from flowing liquids or gases.
U.S. Pat. No. RE30,793, Dunkers, K. R., November 1981, Apparatus for water treatment.

In addition to the patents listed above, a number of inventions in the general field of stormwater treatment methods and devices were discovered during the patent search. The inventions listed below have an element or elements similar to the invention disclosed herein; however, additional elements, details of elements, and/or applications of the inventions differ significantly from the forms and functions of the present invention. While the inventions listed below are intended to provide stormwater treatment, the principle of operation for many of these devices is filtration rather than sedimentation.

U.S. Pat. No. 4,298,471, Dunkers, K. R., November 1981, Apparatus for equalization of overflow water and urban runoff in receiving bodies of water.
U.S. Pat. No. 4,377,477, Dunkers, K. R., March 1983, Apparatus for equalization of overflow water and urban runoff in receiving bodies of water.
U.S. Pat. No. 4,664,795, Stegall, W. A. et al., May 1987, Two-stage waste water treatment system for single family residences and the like.
U.S. Pat. No. 4,747,962, Smissom, B., May 1988, Separation of components of a fluid mixture.
U.S. Pat. No. 4,865,751, Smissom, B., September 1989, Separation of components of a fluid mixture.
U.S. Pat. No. 5,080,137, Adams, T. R., January 1992, Vortex flow regulators for storm sewer catch basins.
U.S. Pat. No. 5,232,587, Hegemier, T. E. et al., August 1993, Stormwater inlet filters.
U.S. Pat. No. 5,322,629, Stewart, W. C., June 1994, Method and apparatus for treating stormwater.
U.S. Pat. No. 5,403,474, Emery, G. R., April 1995, Curb inlet gravel sediment filter.
U.S. Pat. No. 5,437,786, Horsley, S. W. et al., August 1995, Stormwater treatment system/apparatus.
U.S. Pat. No. 5,480,254, Autry, J. L. et al., January 1996, Storm drain box filter and method of use.
U.S. Pat. No. 5,549,817, Horsley, S. W. et al., August 1996, Stormwater treatment system/apparatus.
U.S. Pat. No. 5,702,593, Horsley, S. W. et al., December 1997, Stormwater treatment system/apparatus.

U.S. Pat. No. 5,707,527, Knutson, J. H. et al., January 1998, Apparatus and method for treating stormwater runoff.

U.S. Pat. No. 5,730,878, Rice, T., March 1998, Contaminated waste water treatment method and device.

U.S. Pat. No. 5,744,048, Stetler, C. C., April 1998, Clog resistant storm drain filter.

U.S. Pat. No. 5,770,057, Filion, G., June 1998, Overflow water screening apparatus.

U.S. Pat. No. 5,779,888, Bennett, P. J., July 1998, Filtering apparatus.

U.S. Pat. No. 5,810,510, Urriola, H., September 1998, Underground drainage system.

U.S. Pat. No. 5,840,180, Filion, G., November 1998, Water flow segregating unit with endless screw.

U.S. Pat. No. 5,890,838, Moore, Jr. Et al., April 1999, Stormwater dispensing system having multiple arches.

U.S. Pat. No. 5,972,216, Acernese, P. L. et al., October 1999, Portable multi-functional modular water filtration unit.

U.S. Pat. No. 5,985,157, Leckner, J. P. et al., November 1999, Filter device.

Previous vault or box type treatment devices used in wastewater or stormwater treatment applications acted as "flow-through" systems. In these previous devices, incoming flows enter the device, take a given period of time based on baffles and size to flow through the device, and then exit the device. If flows were coming in continuously, they would enter and exit the device at the same flow rate. Previous devices have different systems within the vault to channel, divert, or reduce flow rates inside the vault in order to facilitate gravity separation. All of these devices are somewhat effective at settling out particles down to a certain size or specific gravity, but none of these devices are effective at removing the very small size range of particles that make up the majority of toxic pollutants in storm water runoff. These particles are typically in the 100-micron and smaller size range, and simply will not settle out of the water if there are horizontal flow velocities present.

Most currently available stormwater treatment devices are designed to reduce the concentrations of pollutants in stormwater by screen, filter or enhanced gravitational separation (i.e. swirl concentrators). However, such systems provide little or no detention capture volume to mitigate the runoff peaks for small or large runoff events. In other words, these systems function as flow-through devices, resulting in the lack of capture volume and overall poor treatment performance. Specifically, much of the settleable materials trapped or deposited during more numerous smaller runoff events are agitated and remobilized, and wash out of these devices when larger and more intense runoff events occur.

Properly sized and maintained wet detention ponds (retention ponds) provide some of the most effective stormwater treatment available. Because of site-specific limitations, however many desirable features of wet detention ponds are not utilized in real world conditions. Available surface area, possible thermal pollution, attractive nuisance liabilities, mosquitoes and long-term maintenance access and disposal are some of the difficulties that must be addressed with a surface pond.

SUMMARY OF THE INVENTION

This stormwater mitigation system solves these problems and more, and includes the benefits of a properly designed retention pond.

The apparatus advantageously settles particles down to a size of 100 microns and smaller out of suspension in the stormwater by utilizing a unique volume control design. The vault of the present invention is designed to treat a given volume of stormwater runoff, as opposed to a given runoff flow rate as treated in other devices. In so doing, the horizontal flows for the entire volume of water to be treated can be nearly eliminated, such that with a reduced flow rate very small particles may drop out of suspension and collect on the bottom of the vault. This is accomplished through a combination of physical space to capture and hold water to be treated, restriction of flow out of the apparatus at a slower flow rate than flow into the apparatus, and vertically stacked pools of water with reduced or eliminated relative flow velocity.

Features that are thought to provide such consistently high quality treatment advantageously include; a permanent pool (i.e., a pool essentially continuously present after it is first filled) to eliminate the resuspension of pollutants, extended quiescent settling conditions to promote retention of the Total Suspended Solids ("TSS") and floatable materials, subsurface conditions that curtail the resuspension of deposited sediment, sufficient volume to retain runoff from the majority of runoff events and capture and treat the "first flush" of the larger events, flow control system to attenuate the runoff flow rates from the majority of storm events and prevent flushing of the captured pollutants, and large surface area that promotes oxygen transfer to reduce pollutant remobilization.

An aspect of this invention is to provide an apparatus for removal of pollutants with densities greater than and less than water from stormwater runoff.

Another aspect of this invention is to provide an apparatus that retains and immobilizes trapped pollutants, even during periods when flows are high.

Another aspect of this invention is to accumulate pollutants that are less and more dense than water until a time when the apparatus is cleaned out.

Another aspect of this invention is to minimize velocity in the vicinity of the bottom of the apparatus to minimize resuspension of deposited sediments and associated pollutants. The slower the velocity of water in at least part of the device, the more effective will be the removal of particles.

Another aspect of this invention is to provide an apparatus that can provide treatment of stormwater for larger tributary drainage areas by addition of modular sections.

Another aspect of this invention is to collect stormwater runoff and release it at a controlled rate over a specified period of time via an outflow opening.

Other aspects and advantages will become apparent hereinafter.

In one embodiment, the apparatus includes a by-pass manhole, apparatus chambers including a plurality of interior baffles, and a junction box. This apparatus, along with properly sized and installed ancillary appurtenances, will advantageously collect and hold floatable debris, runoff bed load particulate material, free oil and grease, settleable sediments and those dissolved pollutants including metals, nitrogen and phosphorus nutrients, and soluble organic compounds the may adsorb or adhere to the surface of sediments and organic debris in stormwater. This apparatus, properly installed and utilizing a properly sized outflow opening aperture installed within an outlet opening, can capture and control the release of site runoff, significantly reducing erosion and stream degradation due to urbanization of the riparian habitat, and helps restore pre-development runoff rates to urbanized areas.

In one embodiment, the apparatus is a below grade modular concrete stormwater control device that is designed to manage and treat stormwater runoff by diverting a predetermined capture volume (or water quality capture volume) into the apparatus. As would be understood by one of ordinary skill in the art, the capture volume is typically sized, for example, between the mean and the maximized runoff event as defined in "Urban Runoff Quality Management," Water Environment Federation (WEF) Manual of Practice No. 23 and American Society of Civil Engineers" (ASCE) Manual and Report on Engineering Practice No. 87. The capture volume is surcharged into detention storage (the active pool).

This capture is brought about by a volume control diversion weir that directs the design capture volume runoff into the apparatus with a minimum hydraulic loss into the apparatus. Any subsequent flow beyond that of the design capture volume is allowed to bypass the apparatus via a volume control diversion weir returning to the stormwater or runoff collection system and/or receiving waters.

During wet weather and periods of site runoff, the detention time of the capture volume may be optimized to promote quiescent sedimentation within the active pool whereby settable solid particles less than 100 microns in size with a specific gravity greater than water will descend and insoluble oil droplets and marginally buoyant debris will float to the surface.

One aspect of the invention is a rectangular chamber of variable length, width and height assembled in a modular fashion. The rectangular chamber contains a system of overflow and underflow baffles, both perpendicular to and oblique to the primary direction of flow from the inlet to the chamber to the outlet from the chamber, which are located at opposite ends of the rectangular chamber. The baffles in the chamber serve several purposes including: flow momentum and energy dissipation, creation of a tortuous flow path, retention and immobilization of pollutants less and more dense than water, minimization of resuspension of sediments, and minimization of remobilization of floatable pollutants into the water column. The primary process for pollutant removal is gravitational separation, which occurs while water is detained in the chamber.

A baffle configuration for minimization of resuspension of trapped sediments and associated pollutants was first conceptualized by the inventors and then optimized by iterative experimentation involving three dimensional velocity measurements and dye visualization for a plurality of baffle configurations using a geometrically and hydraulically scaled physical model. Baffle configurations were evaluated for both dynamic (chamber filling and draining) and steady-state (chamber full with inflow rate equal to outflow rate) conditions. This exhaustive experimentation indicates that the baffle configuration of the invention disclosed minimizes resuspension of fine and coarse sediments and associated pollutants to a degree that exceeds the capabilities of prior art. In addition, a trapezoidal underflow baffle, the shape of which was optimized during hydraulic experimentation, impedes material less dense than water from entering the outflow section and exiting the vault. The trapezoidal configuration has the advantage of decreasing the downward velocity of water approaching and then moving under the baffle and into the outlet section and, thereby, decreases the risk of entraining floatable pollutants trapped behind the trapezoidal baffle into the flow passing into the outlet section. As a result, the plurality of interior baffles and the weir configuration advantageously are designed to provide minimum re-suspension of settable solids from within the permanent pool.

In one aspect, the apparatus has an inlet that delivers water to the chamber from a tributary surface land area, either directly or via storm sewer system piping. Water entering the chamber passes through a system of underflow and overflow baffles both perpendicular to and oblique to the primary direction of flow from the inlet to the outlet, which is located at the end of the rectangular chamber opposite the inflow. As water enters the chamber, the water level in the chamber rises above the permanent pool water surface elevation, which normally is less than or equal to the elevation of the invert of the outflow opening. Outflow from the chamber is controlled by an opening that is sized to provide a specified time for the water in the chamber to drain from the elevation at which the chamber is full to the elevation of the permanent pool. When the rate of inflow is greater than the rate of outflow, the water level in the chamber will rise to the elevation at which the chamber is full. Once the chamber is full, any flow in excess of the outflow rate under full conditions will bypass the chamber via an overflow structure 294. When the rate of outflow is greater than the rate of inflow, the water surface elevation in the chamber will decrease at a rate controlled by the size of the outflow opening, and the water surface elevation will decrease to the elevation of the outflow opening invert, at which time outflow will cease. For convenience and brevity, this chamber inflow volume, as described in previous applications, is herein called a capture volume.

By slowly metering out storm runoff back to the external environment, the apparatus is of great benefit as it not only removes pollutants but also duplicates runoff conditions that exist prior to urban development. This prevents erosion of stream channels, and also prevents a discharge of rapidly flowing runoff that would simply pick up more sediment after treatment.

Another aspect of the invention is a stormwater treatment apparatus, including a receptacle adapted to receive water flowing from a surface drainage area, the receptacle having a bottom and a top, the receptacle having an inlet and an outlet, the inlet and the outlet being in fluid communication with one another; and at least one baffle positioned within the receptacle between the inlet and the outlet, the baffle extending from the bottom of the receptacle, a first portion of the baffle and the bottom of the receptacle forming an angle therebetween.

A stormwater treatment apparatus varies from other types of treatment apparatus, such as septic tanks, in that stormwater treatment apparatus must capture a wide variety of particles of different sizes and compositions in a pulsed hydraulics environment, as opposed to the more constant flow environment of a septic tank. A stormwater treatment apparatus also differs from septic tanks in that the goal is to permanently trap sediments and other pollutants less or more dense than water, rather than to degrade organic matter and other biodegradable substances and in that a stormwater treatment apparatus is much larger than septic tanks, desirably having a volume of at least 500 cubic feet, more desirably at least 600 cubic feet and, preferably, at least 750 cubic feet. Generally, this apparatus size advantageously is sized to include an active pool volume sufficient to treat the capture volume of the area being treated. Additionally, one vault or more than one vault maybe used, depending on the topography of the area being treated, and size of the vault(s) being used. Factors effecting the size and number of vaults used in the apparatus, besides capture volume, include manufacturing capability, transportability to site, modularity of apparatus, cost of construction and installation, site topography, ease of installation, and apparatus footprint.

The apparatus advantageously substantially reduces bottom velocities, thereby greatly reducing resuspension of sediments. In particular, the angle formed between the first portion of the baffle and the bottom of the receptacle is desirably between 30 and 60 degrees, at is desirably inclined in a downstream direction. Further, the height of the baffle is desirably at least two feet to limit the washing out of sediment. To facilitate manufacture and cleaning the baffle desirably includes a second portion, the second portion of the baffle extending from the bottom of the receptacle and forming an angle with the bottom of the receptacle, the angle being roughly 90 degrees.

The apparatus desirably includes an inlet baffle positioned between the inlet and the outlet, the inlet baffle spaced from said bottom and extending between generally opposing walls and an outlet baffle positioned between the inlet and the outlet, the outlet baffle spaced from said bottom and extending between generally opposing walls of the receptacle. The lower end of the outlet baffle is desirably positioned below said outlet. The outlet baffle advantageously may define a horizontal cross-section between a first baffle extending from said bottom and said outlet baffle larger than the horizontal cross-section between said first baffle and a vertical plane tangent to an upstream side of said outlet baffle. This has the effect of reducing the velocity of fluid. In this regard, it is desirable that outlet baffle defines a center section and at least one outer section which extends toward said outlet from said center section. Advantageously, however, the spaces between the outlet baffle and the opposing walls are sufficiently large to permit cleaning and to facilitate manufacture.

Yet another aspect of the invention is an apparatus for cleaning stormwater runoff, the apparatus including a vault having a top, a bottom, two sides, a front and a back, the vault comprising a first baffle extending from the bottom of the vault; a second baffle extending from the bottom of the vault, an inlet section having an opening and an outlet section having an outlet opening.

The apparatus also advantageously includes vertically stacked columns of water, defined by, in one embodiment, varying horizontal flow rates and bounded by baffles creating regions of lower horizontal flow rate. When the vault is filling or full, there is a column of water, called for convenience an "active pool," that is filling via the inlet, draining via the outlet, or both. This pool is the water being held, treated, and released by the invention. As the active pool is treated, sediments settle to the floor of the vault. As a result, when there is water in the active pool, it has a significantly higher velocity than the water in the permanent pool. A typical flow velocity for the active pool is two to three feet per second.

In order to retain sediments and to prevent them from running out of the vault as it empties, and in order to prevent resuspension of the sediments as the vault refills at a later time, the apparatus advantageously includes a permanent pool. The permanent pool sits immediately below the active pool and receives most or all sediments as they drop out of the active pool. Due to the shape, design and spacing of the baffles surrounding and within the permanent pool and active pool, the permanent pool is an inactive pool (a permanent pool that has minimal to no flow velocity.) Based on tests, the inactive permanent pool of the preferred embodiment of this invention maintains flow velocities typically below 0.15 feet per second.

One of the failings of prior "flow-through" systems was their inability to settle small particles from smaller storm flows without resuspending those particles in later large storm flows due to turbulence and currents that reach all areas of the prior vaults. The present apparatus, by creating an active pool that fills, holds and drains immediately above an inactive permanent pool, eliminates small particle re-suspension. Even in prior systems, simply applying baffles to create a physical barrier to sediments moving horizontally through the system, without creating a permanent pool, is only effective for larger, heavier particles: in prior flow-through systems, smaller and finer particles, which form the majority of toxic pollutants, are left without an inactive permanent pool area to reside in and are simply suspended (or re-suspended) in the flow as it moves from compartment to compartment and exits.

A further advantage of vertically stacked pools including a permanent pool is that of maintaining a compact footprint or plan area. By both treating the incoming volume of water and storing sediments in the same plan area more water volume can be treated on a given site.

Finally, the present invention advantageously includes an overflow structure, in one embodiment integral to the outlet section of the vault. When inflow of stormwater exceeds the volume capacity of the treatment system, the overflow structure diverts excess stormwater flow without substantially effecting the ability of the system to effectively treat the full volume of stormwater already in the vault.

BRIEF DESCRIPTION OF THE DRAWINGS

One embodiment of this invention, the best mode, is illustrated in the attached drawings, in which like numerals indicate like components throughout the several views. Views include.

DETAILED DESCRIPTION OF THE PREFERRED EMBODIMENT

Figure 1:
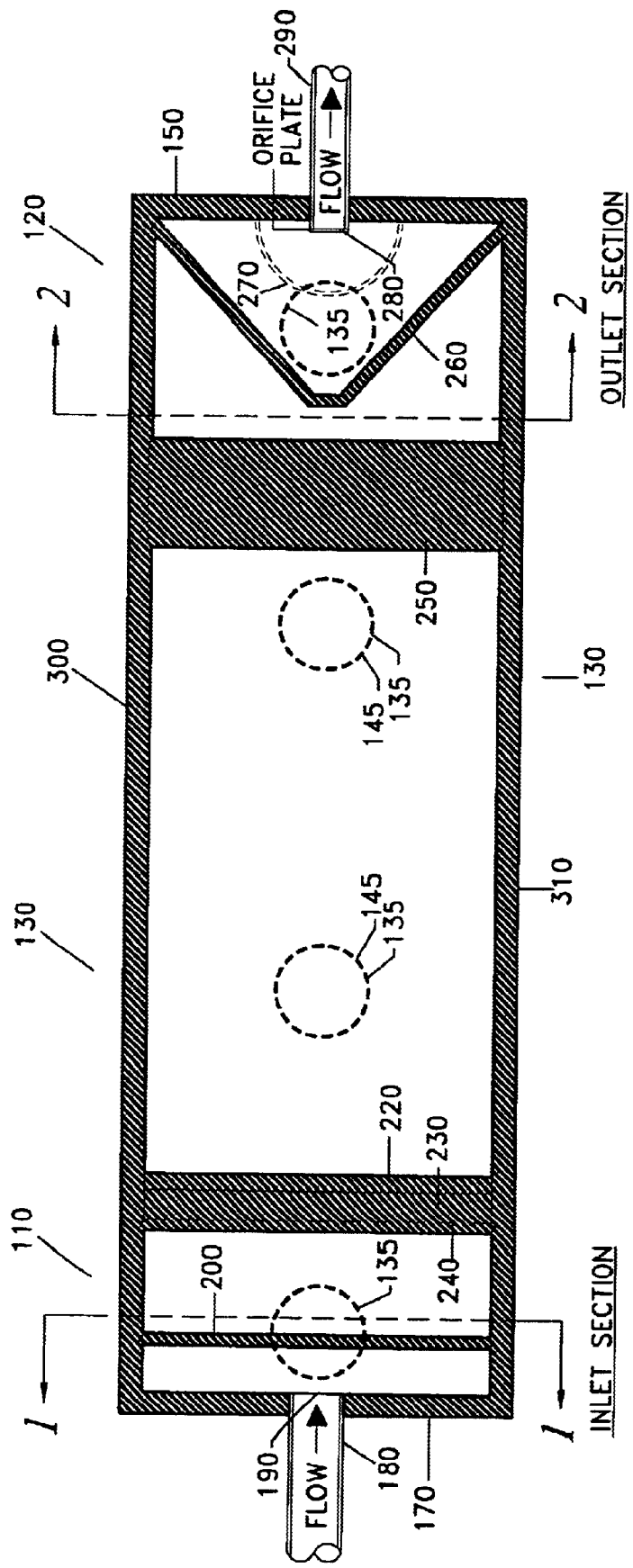
FIG. 1—a plan (from a perspective above the apparatus) view of the apparatus that is the subject of this invention.
Figure 2:
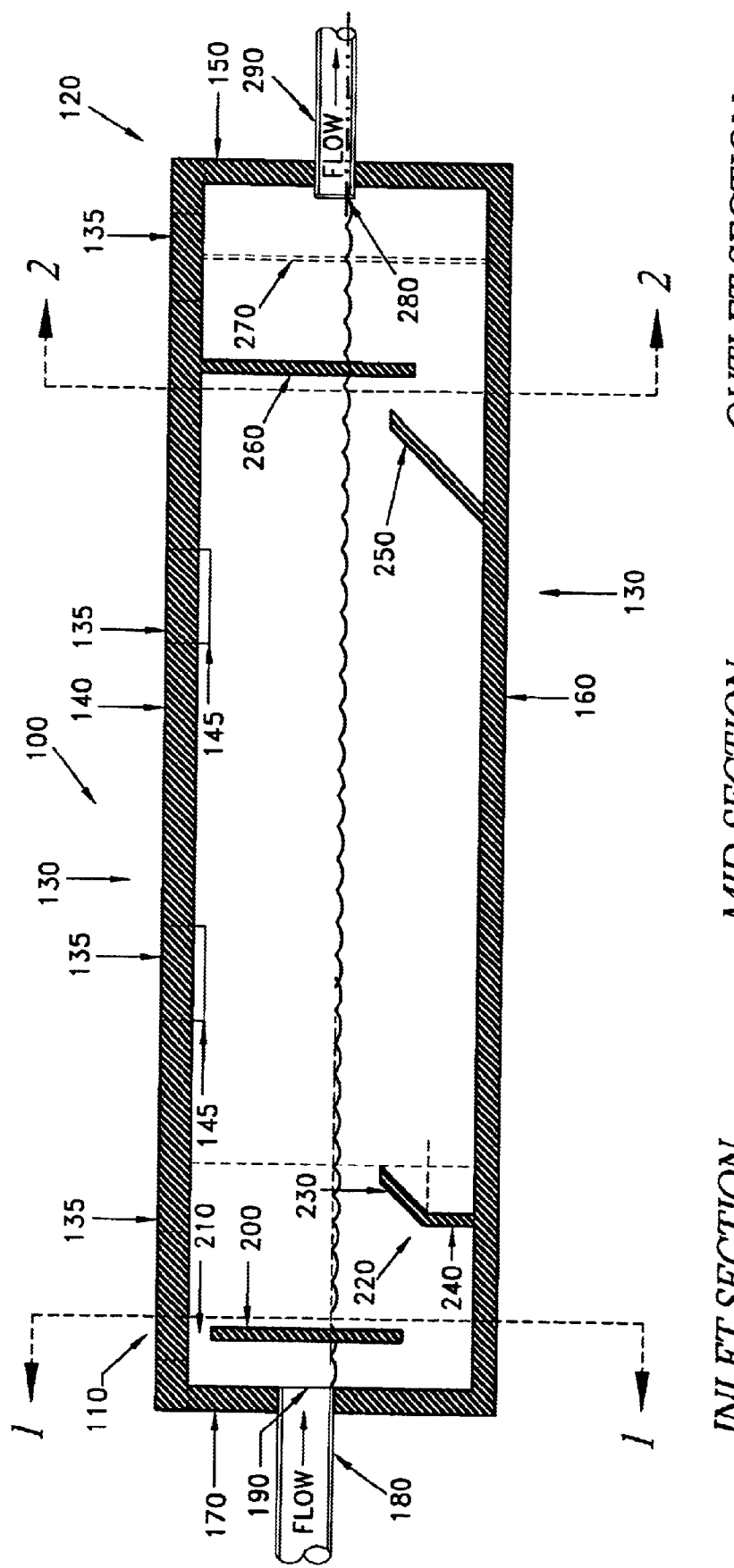
FIG. 2—a profile (side elevation) view of the apparatus.

The drawings illustrate one embodiment of an apparatus 100 for separation of pollutants that are less and more dense than water from stormwater runoff. Referring to FIG. 1 and FIG. 2, the apparatus 100 consists of a top 140, a bottom 160, an inlet end 170, an outlet end 150, a left side 300, and a right side 310 (left and right are relative to the view from the inlet end 170 to the outlet end 150). These sides define a rectangular chamber with an inlet section 110, an outlet section 120, and one or more midsections 130.

The length of the most basic configuration of the apparatus 100 is desirably at most 20 ft, more desirably at most 18 ft 6 in, and, most preferably, 17 ft 6 in (inside dimension); and the width of the apparatus id desirably at most 10 ft, more desirably at most 8 ft 6 in, and, most preferably, 7 ft 6 in (inside dimension); the height of the apparatus is 6 ft or 8 ft (inside dimensions). Outside dimensions and inside dimensions may vary due to structural strength requirements of the apparatus 100. Desirably, the length of the apparatus 100 increases in 4-ft, 8-ft, or 16-ft increments as additional midsections 130 are employed. The top 140 and bottom 160 are desirably parallel to each other and are separated by a distance of 6-ft or 8-ft (inside dimensions). The left side 300 and right side 310 are desirably parallel to each other and are separated by a distance of at most 10-ft, more desirably 8-ft 6-in and, preferably, 7-ft 6-in (inside dimensions). The inlet end 170 and the outlet end 150 are desirably parallel to each other and, for the most basic configuration, are desirably separated by a distance of at most 20-ft and, more desirably, 17-ft 6-in (inner dimension). The distance between the inlet end 170 and the outlet end 150 desirably increases by 4-ft, 8-ft, or 16-ft increments as additional midsections 130 are employed. The thickness of the inlet end wall 170, the outlet end wall 150, the left side 300, the right side 310, and the bottom 160 is desirably at least 3-in and, preferably, 6-in or more. The thickness of these walls may increase or decrease as structural needs of an installation dictate. The thickness of the top 140 of the apparatus 100 is at least 3-in and, desirably, 6-in or more but may increase or decrease as structural needs of an installation dictate.

Based on experience gained after the filing of the original application, it is currently believed that the preferred dimensions for the apparatus are a length of about eighteen feet (along the longest dimension of the apparatus), a width of about eight feet, and a depth of about eight feet. As the apparatus is made larger, though, it advantageously can treat a larger capture volume of stormwater. The preferred method of increasing the size of the apparatus is to add modular midsections to increase the length and treatment capacity of the apparatus. Desirably, the apparatus can thus range from a basic configuration of about eighteen feet in length to compound, large configurations of approximately one hundred feet in length including a plurality of midsections. As topographical, footprint, transportation, manufacturing and capture volume requirements change, these structural dimensions may similarly change.

The ability to increase the size and treatment capacity of the apparatus 100 by addition of modular midsections 130 is advantageous for manufacturing since the apparatus 100 can be manufactured in a wide range of incremental sizes using the same set of forms for precasting. In addition, the modular construction is favorable for applications requiring a large apparatus 100 as the modular sections 110, 120, and 130 can be transported on one or more trucks and then assembled on-site. The incremental sizing may be advantageous for performance at improving water quality as well when the apparatus 100 is sized according to manufacturer's recommendation. For example, if a user, based on sizing calculations, determines that the required capacity of the apparatus 100 necessary to achieve a desired performance is equivalent to the capacity of a midsection with a length of 11-ft, then the user would specify that 2 midsections 130 are needed, one 8-ft long and the other 4-ft long (or two 8-ft long sections), since midsections 130 are discrete components and 1 mid-section 130 would not provide the required capacity. As a result of this modular, incremental sizing, the apparatus 100 specified by the user would always have a capacity equal to or in excess of that required and would, therefore, provide a minimum degree of desired treatment.

A plurality of baffles 220 and 250 are positioned between the inlet end 170 and the outlet end 150. The primary direction of flow is defined as the direction from the inlet end 170 toward the outlet end 150 in the horizontal plane. In the disclosed embodiment, the primary direction of flow is perpendicular to the inlet end 170 and the outlet end 150 and parallel to the top 140, bottom 160, left 300, and right 310 sides. There are two types of overflow baffles employed in this invention. These baffles are referenced as components 220 and 250. Component 220 is a hybrid baffle, and component 250 is an angled baffle. The results of extensive hydraulic testing indicate that the baffle configuration illustrated, as well as the claimed baffle configurations using various combinations of hybrid 220, vertical, and angled 250 baffles, is highly effective at minimizing resuspension of trapped sediments and associated pollutants. Velocity measurements and dye visualization experiments indicate that the apparatus 100 disclosed herein provides a degree of reduction of resuspension that significantly surpasses that of existing art.

Figure 5:
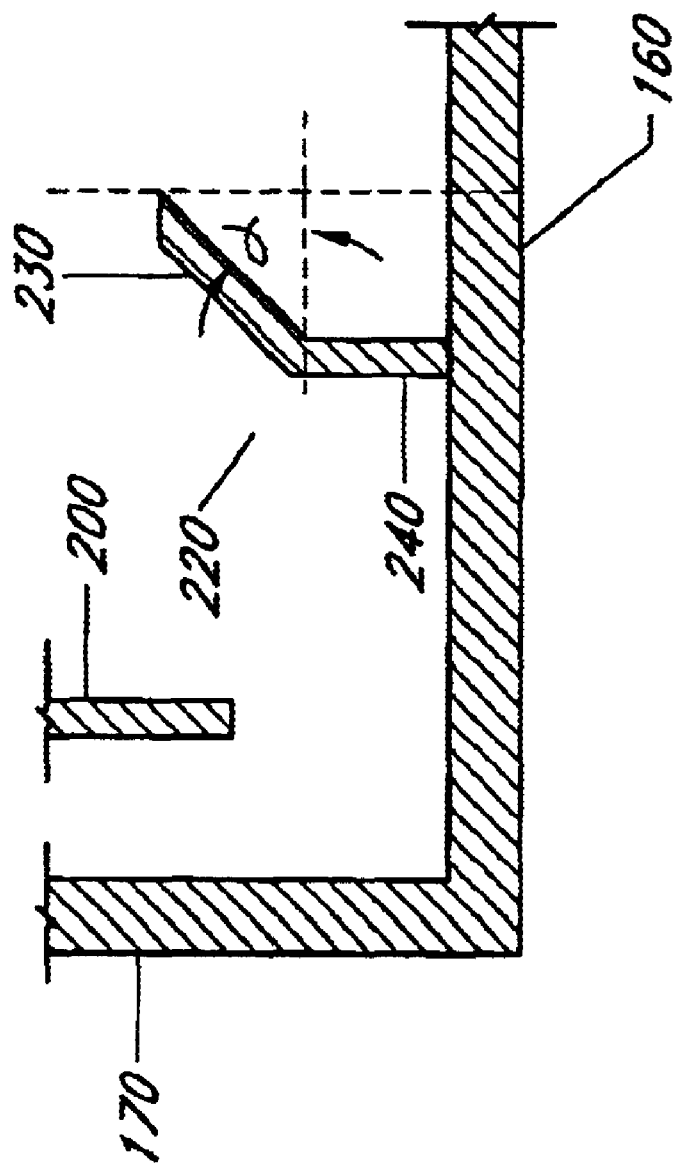
FIG. 5—a detailed (enlarged) profile view of the inlet section baffle configuration.

Referring to FIG. 1, FIG. 2, and FIG. 5, the hybrid baffle 220 consists of a vertical section 240 that is perpendicular to the primary flow direction and an angled section 230 that is oblique to the primary direction of flow, forming an angle, $\alpha$, with the horizontal plane (angle $\alpha$ is depicted in FIG. 5). Preferably, the vertical baffle section 240 has a length of 1-ft and the angled section of the baffle 230 rises from the top of the vertical section 240 at a 45° angle for a distance of 1-ft in the horizontal plane and a distance of 1-ft in the vertical plane. Preferably, the total vertical rise for a hybrid baffle 220 is 2-ft from the chamber bottom 160, and the horizontal projection is 1-ft 3-in. in the downstream direction (including thickness of the vertical section 240). An angle other than 45° may be used for the hybrid baffle 220 as long as the lengths of components 230 and 240 are adjusted to provide a total rise of 2-ft and the downstream end of component 230 does not extend beyond the dimensions of the top 140, bottom 160, and walls 300, 310, and 170 of the precast unit containing the baffle. Desirably, the angle $\alpha$ is between 0° and 90°, and, more desirably, between 30° and 60° degrees.

The angled baffle 250 rises 2-ft from the bottom of the chamber 160. An angled baffle 250 is illustrated in FIG. 1 and FIG. 2 in plan and profile views, respectively. For the best mode, the baffle 250 forms an angle, $\alpha$, of 45° with the chamber bottom 160. An angle other than 45° may be used, provided that a vertical rise of 2-ft is maintained and that the downstream end of the angled baffle 250 does not project beyond the end of the associated 8-ft midsection 130. Hybrid baffles 220 and angled baffles 250 may be interchanged to create numerous embodiments; however, the best mode utilizes a single hybrid baffle 220 in the inlet section 110 and angled baffles 250 in midsections 130, the spacing of which is described below. Other shapes and heights of baffles, up to the full depth of the permanent pool have been tested and are viable alternates to the "best design" shown herein and are part of the design claims of this apparatus 100.

Extensive hydraulic experimentation and testing of baffle configurations and types was conducted to determine baffle geometry that effectively reduced velocities in the lower section of the apparatus 100 where sediments accumulate after settling out of the water. As will be appreciated by one of skill in the art, the creation of this reduced velocity region results in a region of little or no velocity near the gravitational bottom of the vault. That is, this region comprises an inactive permanent pool. Initial testing indicated that angled baffles 250 were more effective than vertical baffles at decreasing bottom velocities in the apparatus' midsections 130. The inventors initially tested angled baffles 250 for the purpose of examining the effect of the angled baffles 250 on flow passing over the crest of the angled baffles 250. In the process of this experimentation, the inventors discovered that the angled baffles 250 had a favorable effect on bottom velocities between two angled baffles 250 separated by a distance of 16-ft or less. A hybrid baffle 220 was developed and tested for the purpose of achieving a reduction in bottom velocities in the midsections 130 comparable to that found using an angled baffle 250, while at the same time decreasing the length in the horizontal plane consumed by the angled baffle 250 by a distance equivalent to the product of the height of the vertical portion of the baffle 240 and the tangent of the angle 90°–α. This reduction in the horizontal distance required to accommodate the hybrid baffle 220 allows the inlet section 110 to be shortened, resulting in a reduction in the amount of material necessary to fabricate the inlet section 110. In addition, the vertical portion 240 of the hybrid baffle 220 has the advantage of improved access for a hose or vacuum to clean out the area beneath the baffle 220. An angled baffle 250 permits access beneath the baffle 250 for cleaning only where the distance between the under-surface of the baffle 250 and the bottom of the chamber 160 (inside dimension) is greater than the diameter or height of the intake component of the vacuum or pumping cleaning system. For both angled 250 and hybrid 220 baffles, the experimentation conducted indicated that both types of baffles 250 and 220, performed very well at evenly distributing flow across the width of the apparatus 100.

Water is supplied to the apparatus inlet section 110 via an inlet pipe or other conveyance 180 carrying water from the tributary drainage area to the inlet of the apparatus 190. The invert of the inlet aperture 190 is desirably at least 3-ft above the chamber bottom 160 (inside dimension). The apparatus 100 may also receive water from the tributary drainage area directly rather than via an up-gradient, piped storm sewer system. An example of this configuration would be an apparatus 100 installed to receive water from a manhole chamber below a curb-side drop inlet.

Figure 3:
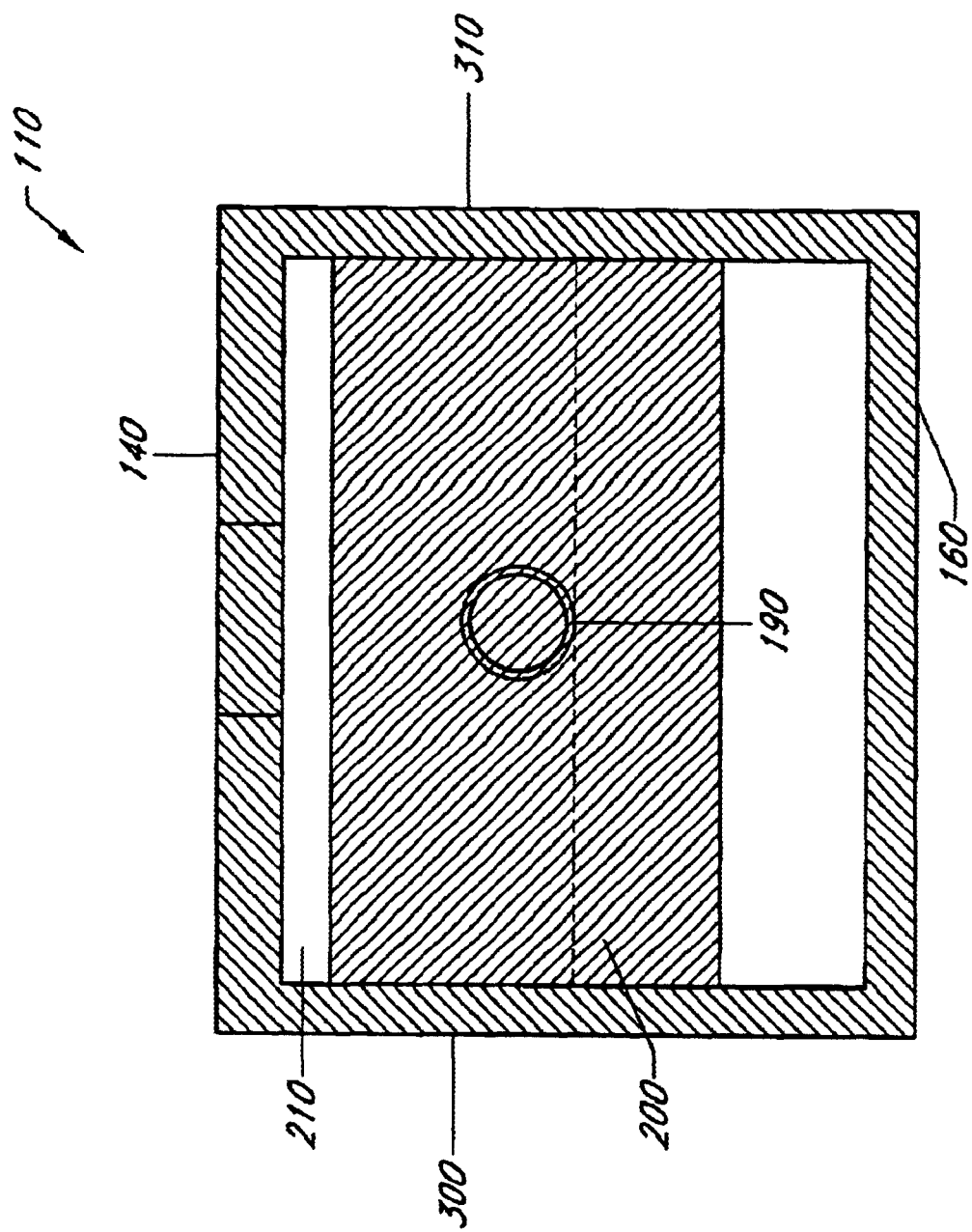
FIG. 3—a cross-sectional view of the inlet section of the apparatus (cross-section 1—1 shown on FIG. 1 and FIG. 2)

The inlet section 110 consists of several distinct components that are shown in FIG. 1, FIG. 2 in plan and profile views, respectively. FIG. 3 shows a cross-section (1—1) of the inlet section 110, and FIG. 5 shows details of the baffle configuration for the inlet section 110. The dimensions of the inlet section 110 are defined by the inlet end wall 170; the top 140, bottom 160, left 300, and right 310 sides; and a plane perpendicular to the primary direction of flow located a prescribed distance from the inside dimension of the inlet end wall 170 in the downstream direction. This prescribed distance is defined by the length dimension of the precast segment containing the energy dissipation baffle 200 and the most upstream hybrid 220 or angled 250 baffle and, most preferably is 4-ft 9-in. The dimensions of the inlet section 110, exclusive of baffles, desirably are equivalent to the dimensions of the outlet section 120, providing the advantage of having the capability to cast inlet 110 and outlet 120 sections using the same form. The inlet section 110 desirably includes a manhole 135 for access to the inlet section 110 for maintenance. The cover of the manhole 135 is desirably vented to allow exchange of air between the inside of the apparatus 100 and the surface atmosphere to prevent anoxic conditions from developing in the permanent pool. The permanent pool is defined as the volume of water and trapped pollutants in the apparatus 100 above the bottom of the chamber 160 and below the invert of the outflow opening 280.

A component of the inlet section 110 is a flow energy dissipation baffle 200 that is perpendicular to the primary direction of flow. The energy dissipation baffle 200 is parallel to the inlet end wall 170 and is positioned so that the side of the energy dissipation baffle 200 facing the inlet wall 170 is desirably at most 1-ft 6-in and preferably 1-ft from the inner side of the inlet end wall 170 in the primary direction of flow. The energy dissipation baffle 200 desirably is connected to the left side 300 and right side 310 from a distance of desirably at most 2-ft and preferably 1-ft 6-in above the chamber bottom 160 (inside dimension) to a distance of desirably at most 1-ft, and preferably 6-in from the chamber top 140 (inside dimension). The energy dissipation baffle 200 desirably has a thickness of 3-in. The purpose of the flow energy dissipation baffle 200 is to decrease the energy of the incoming flow. For the apparatus 100 described herein, the decrease in flow energy translates to a decrease in the velocity of the incoming water. The space 210 is provided between the top of the energy dissipation baffle 200 and the top 140 of the apparatus 100 for the purpose of allowing overflow for high flows and for the purpose of providing access for maintenance. Hydraulic testing indicates that the energy dissipation baffle 200 is effective at decreasing flow energy. The inventors examined several options for spacing between the inlet end wall 170 and the flow energy dissipation baffle 200 and found that the above-described spacing provided a good balance between the effectiveness of energy dissipation and the space necessary to access the area between the inlet end wall 170 and the baffle 200 for maintenance.

Another element of the inlet section is the inlet overflow baffle 220. The inlet overflow baffle 220 is a hybrid baffle (described above). The inlet overflow baffle 220 desirably is connected to the chamber bottom 160 and the left 300 and right 310 sides of the chamber so that water can only pass over the top of the baffle, defined by component 230. The vertical portion 240 of the inlet overflow baffle 220 desirably is located a distance of at least 2-ft 6-in, more desirably at least 3-ft, and preferably 3-ft 6-in from the inlet end wall 170 (inside dimensions). The thickness of the inlet overflow baffle 220 is desirably 3-in. The vertical rise for the inlet overflow baffle 220 is desirably at most 3-ft, more desirably at most 2-ft 6-in, and, preferably, 2-ft, and the horizontal distance in the direction of flow is desirably at most 2-ft, more desirably at most 1-ft 6-in, and, preferably, 1-ft 3-in (including the baffle thickness of 3-in) for the best mode.

Figure 8:
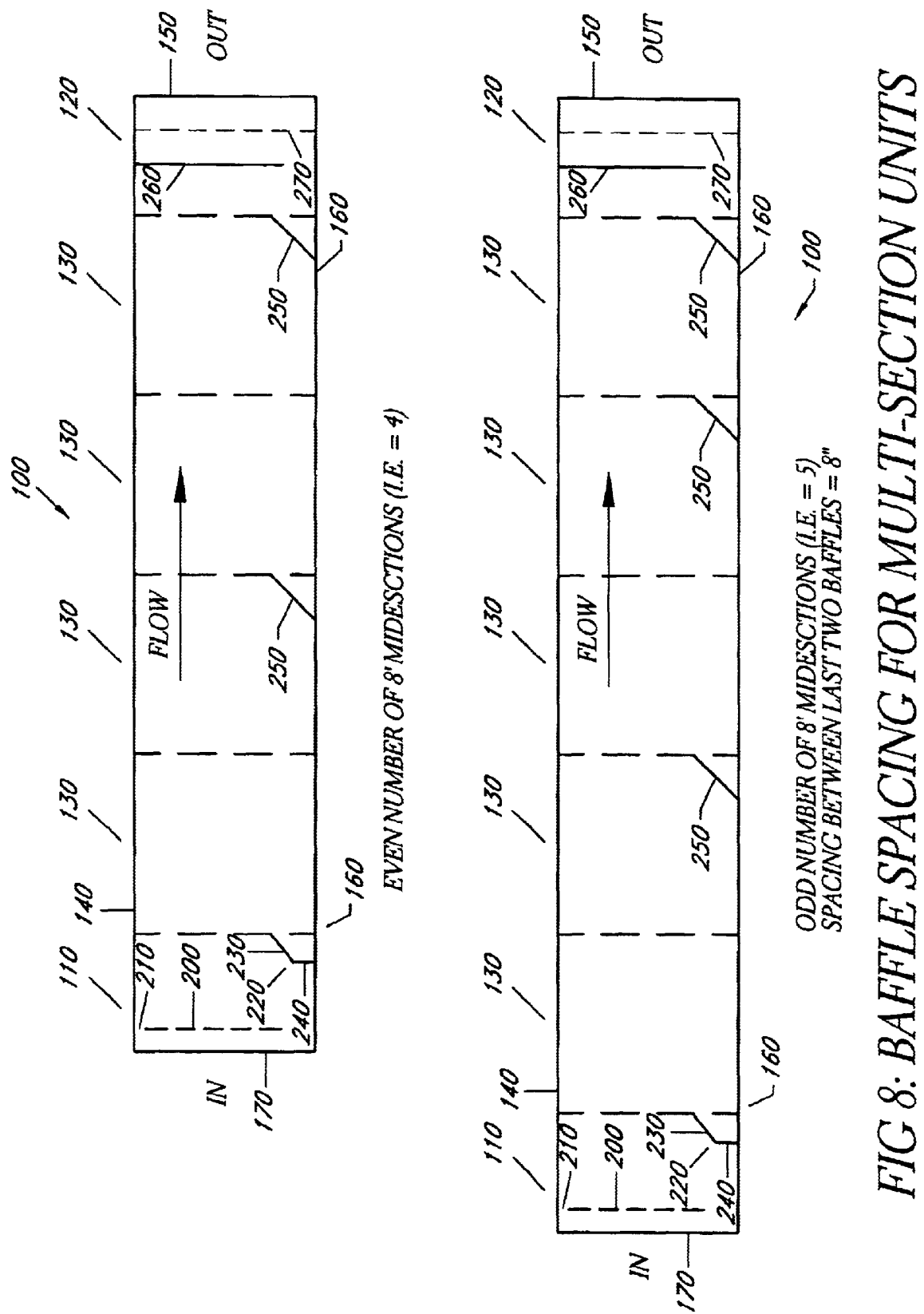
FIG. 8—an illustration of baffle spacing for this invention for even and odd numbers of chambers for a multi-chambered apparatus (the number of midsections depicted in this view, four for the even illustration and five for the odd illustration, are specific examples of the generalized odd and even baffle spacing rules and are not intended to be restrictive)

A midsection 130 of the apparatus 100 is defined by a top 140, a bottom 160, a left 300, and a right 310 side that desirably are connected at 90° angles to form an open-ended rectangular section. FIG. 1 and FIG. 2 depict an apparatus 100 with two, 8-ft midsections 130. The apparatus 100 desirably has at least one midsection 130 but may have additional midsections 130. Desirably, the midsections 130 have a length of 16-ft, more desirably 4-ft, and, preferably, 8 ft. Angled baffles 250 desirably are spaced at 4-ft increments, more desirably at 8-ft increments, and, preferably, at 16-ft increments in midsections 130. For midsections 130 requiring angled baffles 250 to achieve this spacing, an angled baffle 250 (described above) is attached to the bottom of the midsection 130 so that the downstream tip of the angled baffle 250 coincides with the end of the midsection 130. Such an angled baffle 250 in a midsection 130 is shown in FIG. 1 and FIG. 2 in plan and profile views, respectively. While an angled baffle 250 desirably is used in the midsections 130, vertical, hybrid, or other baffle shapes 220 may be used. Since baffle 220 and 250 spacing is preferably 16-ft and midsections 130 are added in 4-ft, 16-ft, or 8-ft increments, not all midsection segments 130 will need baffles 220 and 250. FIG. 8 illustrates baffle 220 and 250 spacing. As FIG. 8 indicates, baffles 220 and 250 preferably are spaced every 16-feet, and a baffle 220 and 250 is desirable at the end of the most downstream midsection 130. Therefore, for an even number of midsections 130, desirably with a length of 8-ft (four as an example in FIG. 8), all overflow baffles 220 and 250 are preferably spaced 16-feet apart. For an odd number of midsections 130, desirably with a length of 8-ft, (five as an example in FIG. 8), however, spacing is preferably 16-feet between all overflow baffles 220 and 250 with the exception of the spacing between the penultimate and ultimate downstream baffles 220 and 250 at the end of the most downstream midsection 130. The number of midsections 130 depicted in FIG. 8 are shown as examples of even and odd numbers of midsections 130 and should not be interpreted as restrictive specifications. Each midsection 130 desirably will have a manhole 135, allowing access through the top of the chamber 140 for maintenance. Desirably, all manholes 135 will be vented to prevent development of anoxic conditions in the permanent pool and will be of sufficient size to allow the contents of the apparatus 100 to be pumped out as a part of regular maintenance. Manholes 135 positioned above midsections of the apparatus 100 desirably will have a collar 145 with approximately the same inner diameter as the manhole that extends into the chamber 3-in below the top 140. The purpose of the collar 145 is to limit the surface area of the water and associated floatable pollutants in the chamber that could potentially be forced out of the apparatus 100 via vents in manhole access areas 135 when the apparatus 100 fills completely.

The midsection 130 components of the apparatus 100 are the primary treatment and pollutant collection chambers. During the time that water is detained in the apparatus 100, sedimentation occurs, resulting in deposition of sediments and associated pollutants with densities greater than water on the bottom 160 of the midsections 130. The configuration of baffling 220 and 250 is such that sediments deposited on the bottom 160 of the midsections 130 resist resuspension during subsequent runoff events. Once the thickness of the sediment layer on the bottom 160 of the midsections 130 increases to a prescribed depth, the apparatus 100 is cleaned via a pump-out or other method to remove the permanent pool and trapped pollutants from the apparatus 100 for disposal.

In addition to sediment removal, the midsections 130 of the apparatus 100 collect and retain materials less dense than water. During the time that water is detained in the apparatus 100, materials that are less dense than water rise toward the water surface. Since flow from the midsections 130 passes to the outlet section 120 by flowing beneath the trapezoidal baffle 260, pollutants on the water surface in the midsections 130 are retained on the upstream side of the trapezoidal baffle 260. Due to the elevation of the invert of the outlet opening 280, the surface of the permanent pool in the apparatus 100 desirably remains at least 1-ft above, and, preferably, 1-ft 5-in above the highest elevation at which water can pass below the trapezoidal underflow baffle 260. As described below, the trapezoidal geometry of the underflow baffle 260 is advantageous for prevention of entrainment of pollutants collected on the surface of the midsections 130 into the flow beneath the trapezoidal baffle 260 entering the outlet section 120. Desirably, a mat or mats composed of material capable of absorbing petroleum-based hydrocarbons with densities less than that of water will be placed in the midsections 130 of the apparatus 100 for the purpose of immobilizing these pollutants. Manholes 135 will be large enough to permit removal of the absorbent mats.

Figure 6:
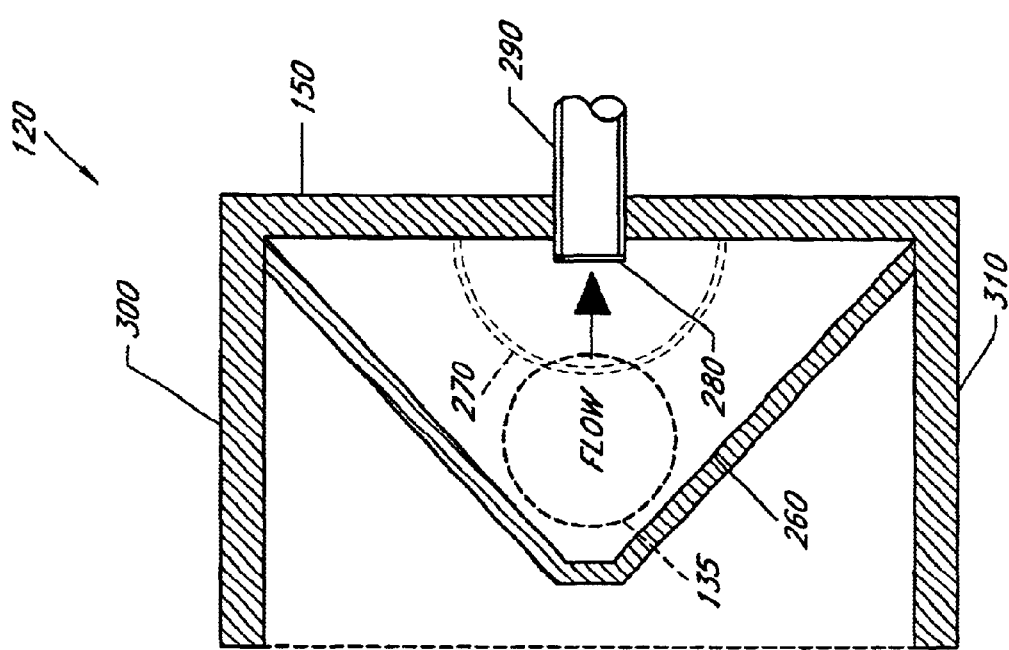
FIG. 6—a detailed plan view of the outlet section
Figure 7:
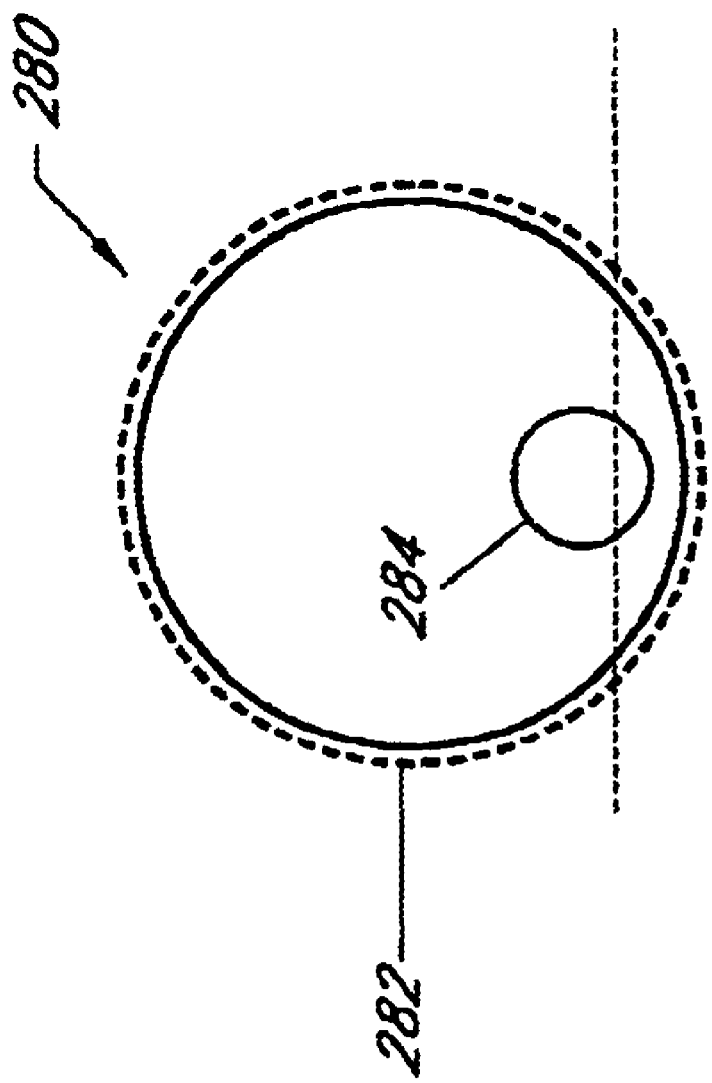
FIG. 7—a detailed view of the outflow opening configuration.

A detailed plan view of the outlet section 120 is shown in FIG. 6, and a detail of the outflow opening configuration 280 is shown in FIG. 7. The dimensions of the outlet section 120 are defined by the outlet end wall 150; the top 140, bottom 160, left 300, and right 310 sides; and a plane perpendicular to the primary direction of flow located 4 ft 9 in from the inside dimension of the outlet end wall 150 in the upstream direction. The dimensions of the outlet section 120, exclusive of baffles, are equivalent to the dimensions of the inlet section 110, providing the advantage of having the capability to cast inlet 110 and outlet 120 sections using the same form.

One component of the outlet section 120, is a trapezoidal underflow baffle 260. In the plan view (FIG. 1 and FIG. 6), the trapezoidal underflow baffle 260 desirably consists of a center segment parallel to the outlet end wall 150 and a pair of outer segments. The center segment is located desirably at least 2-ft, more desirably 3-ft, and, preferably 4-ft from the outlet end wall 150 (inside dimension of end wall to upstream side of trapezoidal baffle 260). The center segment of the baffle 260 is centered with respect to the left 300 and right 310 sides of the chamber. Preferably, the length of the center segment 260 is 1-ft and, as a result, the distance between the ends of the center segment of the baffle 260 and each wall 300 and 310 is 3-ft 3-in. In the plan view, the trapezoidal baffle extends from the ends of the center segment to the corners defined by the intersection of the left side wall 300 and the outlet end wall 150 and the right side wall 310 and the outlet end wall 150. In the profile view (FIG. 2), the trapezoidal baffle 260 is located so that the bottom of the baffle 260 desirably is at most 1-ft 11-in and, preferably, 1-ft 6-in above the bottom of the chamber 160 (inside dimension). The baffle 260 extends to the top of the chamber 140 and is joined to the top of the chamber 140 along the trapezoidal-shaped top edge of the baffle 260 displayed in the plan view (FIG. 1 and FIG. 6). The trapezoidal underflow baffle 260 desirably is also attached to the sides of the apparatus 100 where the left and right sides 300 and 310, respectively, form corners with the outlet end 150 from a distance, preferably, 1-ft 6-in above the bottom of the chamber 160 (inside dimension) to the top of the chamber 140.

Initially, the inventors tested a simple, vertical underflow baffle with a thickness of 3-in that was positioned in a plane entirely perpendicular to the outlet end wall 150. This incarnation of the underflow baffle was located a distance of 4-ft from the outlet end wall 150 (inside dimension of end wall to upstream side of underflow baffle) and resulted in an area of 5.625 $ft^2$ between the downstream end of the angled baffle 250 and the upstream side of the underflow baffle in the plan view (see FIG. 1). The inventors investigated the trapezoidal underflow baffle 260 of the present invention for the purpose of decreasing the velocity of the flow passing through the plane between the downstream end of the angled baffle 250 and the upstream side of the underflow baffle 260 in the plan view. The area in the plan view between the downstream end of the angled baffle 250 and the upstream side of the underflow baffle 260 is preferably 18.625 ft². Comparison of the areas between the underflow baffle and the upstream angled baffle 250 for the vertical underflow baffle configuration and the trapezoidal underflow baffle 260 configuration indicates that for equivalent rates of flow passing between the upstream angled baffle 250 and the underflow baffle, the velocity for the vertical baffle configuration preferably would be 3.3 times greater than the velocity for the trapezoidal baffle 260 configuration. The lower velocity attained using the trapezoidal baffle 260 configuration of the present invention is advantageous for protection from entrainment of pollutants residing on the surface layer of the midsections 130 into the flow from the midsection 130 to the outlet section 120. Desirably, the angle between the center segment of the baffle and the outer segments of the baffle is between 90° and 180, more desirably between 120° and 160°, and, preferably 130°.

Another component of the outlet section 120 is outlet screening 270 which is designed to keep trash and/or debris from clogging the outlet opening 280. The outlet screening 270 consists of fine screening or a fine mesh configured as a semi-circle, arch, rectangle, or straight screen in front of the outflow opening 280. The screening is attached to the outlet end wall 150 a horizontal distance in front of the outlet opening that is proportionate to the outlet opening size, but no less than 2 times the diameter of the outlet opening and to the bottom 160 and top 140 of the chamber so that all water passing through the outflow opening 280 will have first passed through the screening 270. The screening 270 will be attached in a manner that will permit removal and cleaning of the screening via an access manhole 135 located in the top of the outlet section 120. The cover for the manhole 135 will be vented to allow exchange of air between the inside of the apparatus 100 and the surface atmosphere to abate development of anoxic conditions in the permanent pool and to relieve air pressure as the apparatus fills and drains with water.

Figure 4:
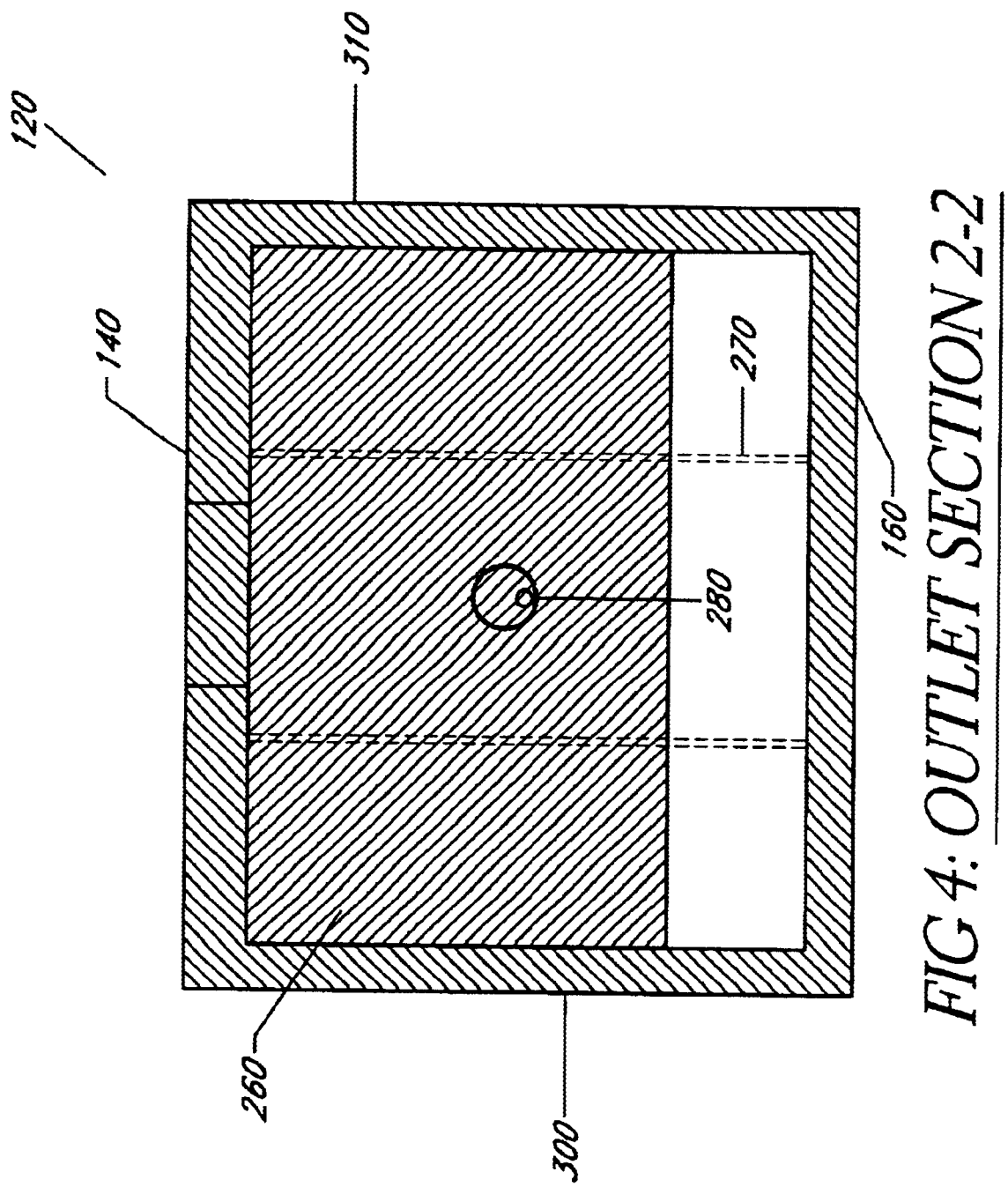
FIG. 4—a cross-sectional view of the outlet section of the apparatus (cross-section 2—2 shown on FIG. 1 and FIG. 2)

The outflow opening 280, shown in FIG. 1, FIG. 2, and FIG. 4 is the device controlling the release of water from the apparatus 100. A detail of the outflow opening 280 components is shown in FIG. 7. The outlet desirably consists of an 8-in diameter pipe 290, desirably extending from 3-in upstream of the outlet end wall 150 (inside dimension), through the outlet end wall 150. The end of the pipe 290 that is inside the apparatus 100 desirably is covered with an 8-in cap 282. An opening 280 that is sized to provide a predetermined time for the water in the chamber to drain from the elevation at which the apparatus 100 is full to the elevation of the permanent pool is machined into the 8-in cap 282. The opening 280 is manufactured so that the lowest point of the opening is preferably at least ½-in above the lowest point of the 8-in pipe 290 at the end where the cap 282 is attached.

An advantage of creating the outflow opening aperture 280 in a cap 282 that is placed over the end of the outflow pipe 290 that is inside the outlet chamber is that the opening size can be changed as desired during maintenance by replacing the cap 282 with another cap 282 with a different sized opening 280. This flexibility in opening 280 sizing is advantageous for providing an apparatus 100 that can provide an array of treatment levels. The opening aperture size 284 dictates the time that water is detained in the apparatus 100. A smaller opening aperture size 284 would result in detention of water for a longer period of time than that afforded by a larger opening size. The treatment efficiency of an apparatus 100 will increase as the time that water is detained increases. Therefore, the level of treatment can be adjusted by increasing the opening size (decreasing the level of treatment) or decreasing the opening size (increasing the level of treatment). Another advantage of the outflow opening configuration 280, is that the positioning of the opening invert, preferably, a distance of 2-ft 11-in above the bottom 160 and downstream of all baffling 200, 220, 250, and 260 results in release of water with the lowest sediment concentrations through the opening 280. An outflow opening 280 positioned lower than that in the illustrated embodiment would draw more water from the lower part of the outlet section 120, which would contain more suspended sediments. An outflow opening 280 positioned higher than that in the illustrated embodiment would result in a greater permanent pool volume that would need to be pumped out during maintenance.

The apparatus, being an off line type below grade structural stormwater control device, in one embodiment manages the recommended capture volume—sized for a mean runoff event following the sizing criteria as outlined in, for example, the "Urban Runoff Quality Management", WEF Manual of Practice No. 23, and ASCE Manual and Report on Engineering Practice No. 87 or other source known to one of ordinary skill in the art.

Storm events are, in one embodiment, handled by diverting that percentage of stormwater events from the site storm drainage collection system. The apparatus advantageously provides adequate time for the capture volume within the active pool for pollutants with specific gravities of lesser or greater than water to be captured within the hydraulically designed plurality of baffling within the permanent pool (i.e., permanent pool), reducing sediment resuspension, retaining floating debris and hydrocarbons, and trapping neutrally buoyant trash.

As known to one of ordinary skill in the art, a mean runoff event is typically defined, for example, as the event resulting from the "mean storm precipitation depth, which is the depth of all runoff-producing storms (total precipitation of 2.5 mm or 0.10" or more) from a long-term precipitation record for a given location, using a six-hour separation to define each storm event. This "mean storm event capture volume" will typically result in the capture of roughly 70% of all runoff-producing events in their entirety or approximately a "two-year storm," defined as a stormwater event that occurs on average once every two years, or statistically has a 50% chance on average of occurring in a given year. Other methods for determining the capture volume can similarly be employed, depending on site requirements.

Figure 9:
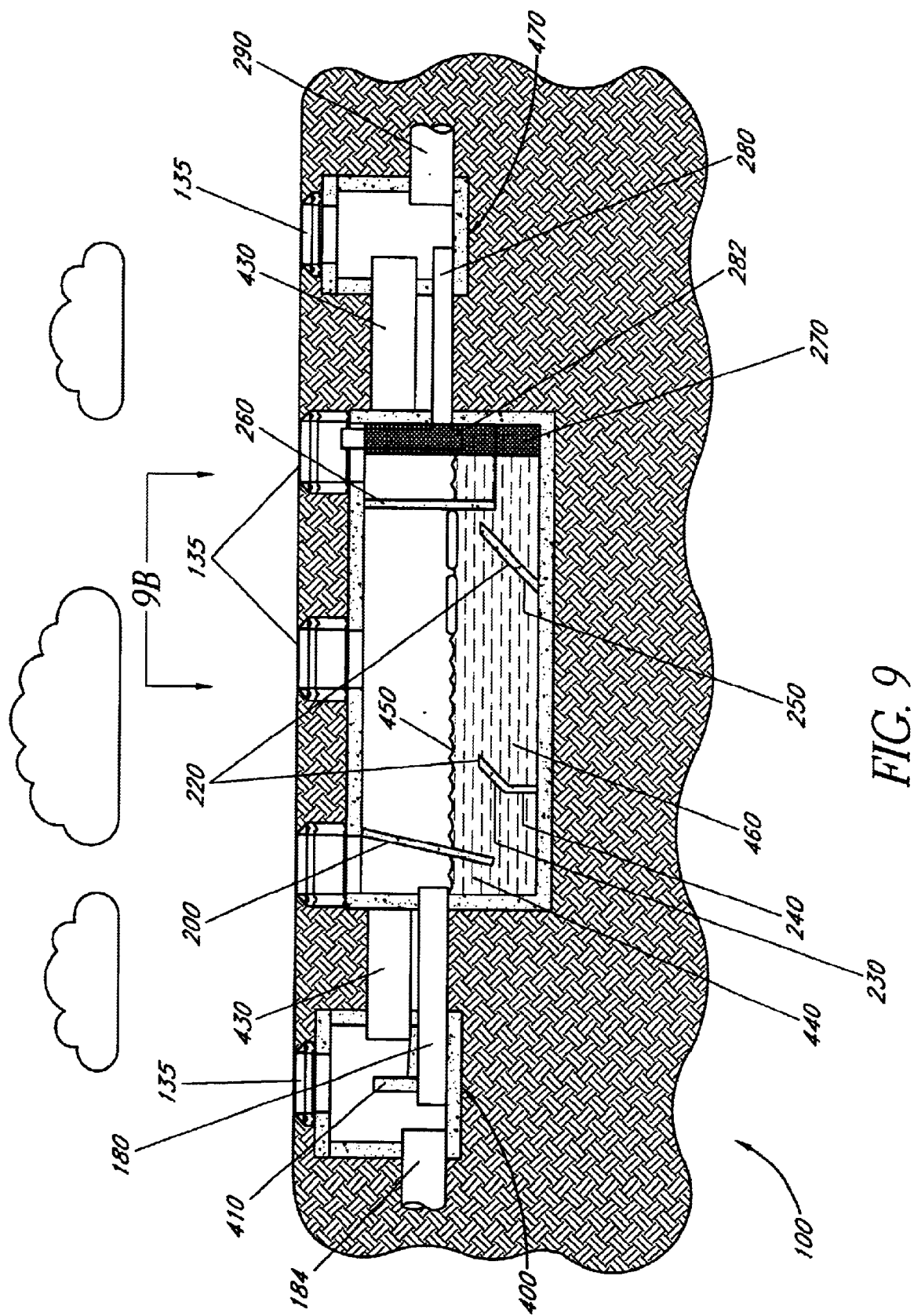
FIG. 9—an illustration of a modified embodiment of the present invention, including an external bypass structure.

FIG. 9 illustrates one embodiment of the present invention, including an external bypass structure. In this embodiment, the apparatus 100 inflow rate is controlled by a site-specific designed control weir 410 housed within a bypass manhole 400 of the type well-known to those of ordinary skill in the art. Influent enters the system from a drainage system, as well known to one of skill in the art, from a sewer system main or, for example, an inflow pipe 184. The properly sized weir 410 diverts the site runoff into the apparatus 100 through the apparatus influent pipe 180. Bypass pipes 430 divert excess water volume beyond the maximum capture volume by diverting excess water volume over the control weir 410 and through the bypass pipes 430. The bypass manhole 400 is typically accessed by an access manhole 135.

The energy dissipation baffle 200 is so located to diffuse and create a laminar flow of the turbulent high velocity stormwater runoff on entry into the apparatus 100. The baffle is angled to extend toward the front of the vault as it extends downward. The reduced energy stormwater is diverted in less turbulent lower velocity downward against the bottom of the apparatus 100, and under the energy dissipation baffle 200 to be directed upward by the hybrid baffles 220. The capture area between the energy dissipation baffle 200 and the inlet end wall provides an area for the capture and retention of the larger and more buoyant trash and debris, as known in the art, in a forebay trash compartment 440. This trash area is accessed via a manhole 135 for subsequent collection and removal of sequestered debris via vacuum suction lift or other mechanical means. Advantageously, the forward angled energy dissipation baffle 200 permits easy access via the manhole 135 while providing additional energy dissipation.

The hybrid-baffles 220 (including, for example, 230, 240 and 250) are so located with respect to the energy dissipation baffle 200 to direct the initial and subsequent stormwater inflow in an upward direction thereby providing a laminar flow pattern in the active pool 450 reducing the turbulence in the inactive permanent pool 460 to near zero, thus preventing resuspension of previously settable materials. The available active pool 450 above the permanent pool 460 provides a vertically stacked water column desirably sized to accommodate the design capture volume.

This ability to exploit the vertically stacked water column configuration provided by the preferably rectangular design of the apparatus 100 enhances the ability to capture stormwater runoff from a site. By simply selecting the appropriate water volume, the apparatus 100 can significantly reduce erosion and stream degradation from increased flows due to urbanization and help restore pre-development runoff rates. Due to an effective stacked water column volume control, the apparatus has superior pollution removal and retention capabilities the apparatus advantageously mitigates downstream erosion and riparian habitat degradation through retaining and slowly metering out the capture volume, through the properly sized outflow opening aperture 284 installed within outlet opening 280, flow from each event.

Intermediate angled baffle(s) 220 are so arranged to provide optimum volume and sediment control spacing by maintaining the upward directional stability of the stormwater inflow. These sediment control baffles 220 advantageously provide an uninterrupted quiescent area of capture volume to sequester settable solids and pollutants, reducing the probability of resuspension during the introduction of stormwater into the apparatus. The longitudinal spacing of the angled baffle(s) 220 is preferably optimized to provide a minimum of one manhole 135 access for every approximately 64 square feet of pollutant capture area for subsequent collection and removal of sequestered sediment and hydrocarbon material via vacuum suction lift or mechanical means. In one embodiment, the minimum size for the bypass manhole 400 is typically around 36" by 36" square or, alternatively, 48" inside diameter. There typically is a 30" minimum spacing between the bypass manhole 400, outlet box 470 and the main tank 480 of the apparatus 100 to allow sufficient space for the installation and sealing of influent connection pipes 180 and effluent connection pipes.

As known to one of ordinary skill in the art, the influent connection pipes 180, effluent connection pipes 290, and bypass pipes 430 are typically supplied and cut to proper length depending on the topography, flow, and specific requirements of a particular site. Similarly, the dimensions of the apparatus will vary based on site requirements.

The decant period or drain down time is optimized to allow for the gravity separation of pollutants with either a specific gravity less than or greater than water. The retention time of the capture volume in the stacked water column provides a quiescent period for enhanced settling, and is consistent with recommendations shown in "Removal Rate vs. Detention Time for Stormwater Pollutants as defined in "Effectiveness of Extended Detention Ponds" authored by Grizzard et al., 1986 or other similar period recommendations as commonly known to those of skill in the art.

In one embodiment, the process capture volume stormwater flow rate is metered by a fixed aperture orifice 280 to insure proper retention of the capture volume and regulate maximum discharge flow rate. In one embodiment, a flow control orifice may be, for example, mounted in a sealed outlet tee fitting with a standpipe 490 top rim at such elevation to prevent flow "short circuiting" at maximum water levels.

The orifice 280 is desirably protected from neutrally buoyant material by a removal screen 270, which desirably typically includes a minimum net opening area of about 25 to 50 times the opening of the orifice, and preferably about 35 times the opening of the orifice. The orifice 280, standpipe 490, and screen 270 are preferably constructed of non-metallic non-corrosive materials.

Figure 10A:
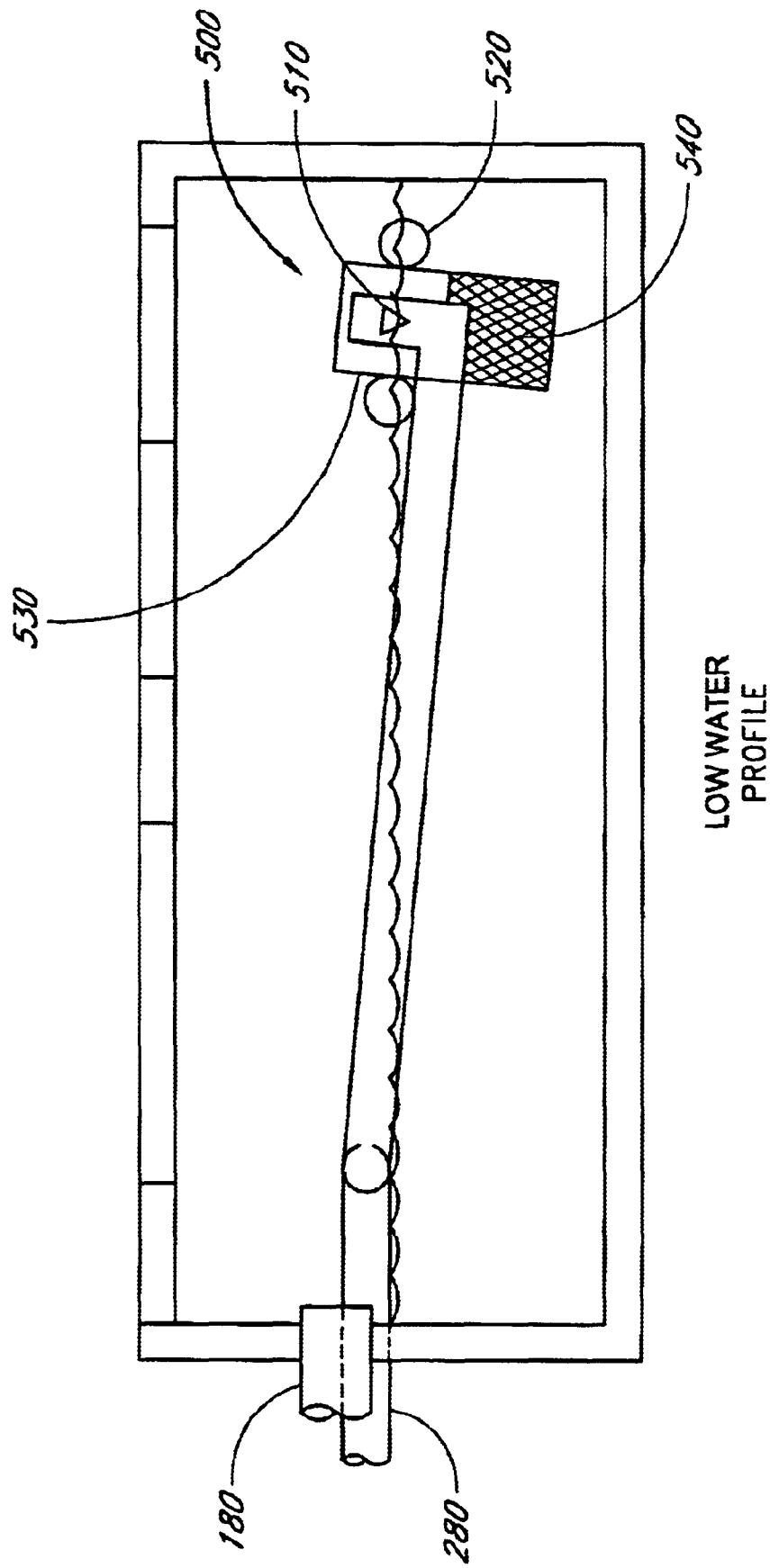
FIG. 10—an illustration of the apparatus, in one embodiment, incorporating a gravity dynamic flow control orifice; and, FIG. 11—a detail plan view of the apparatus, in one embodiment, incorporating an integral overflow bypass structure.
Figure 10B:
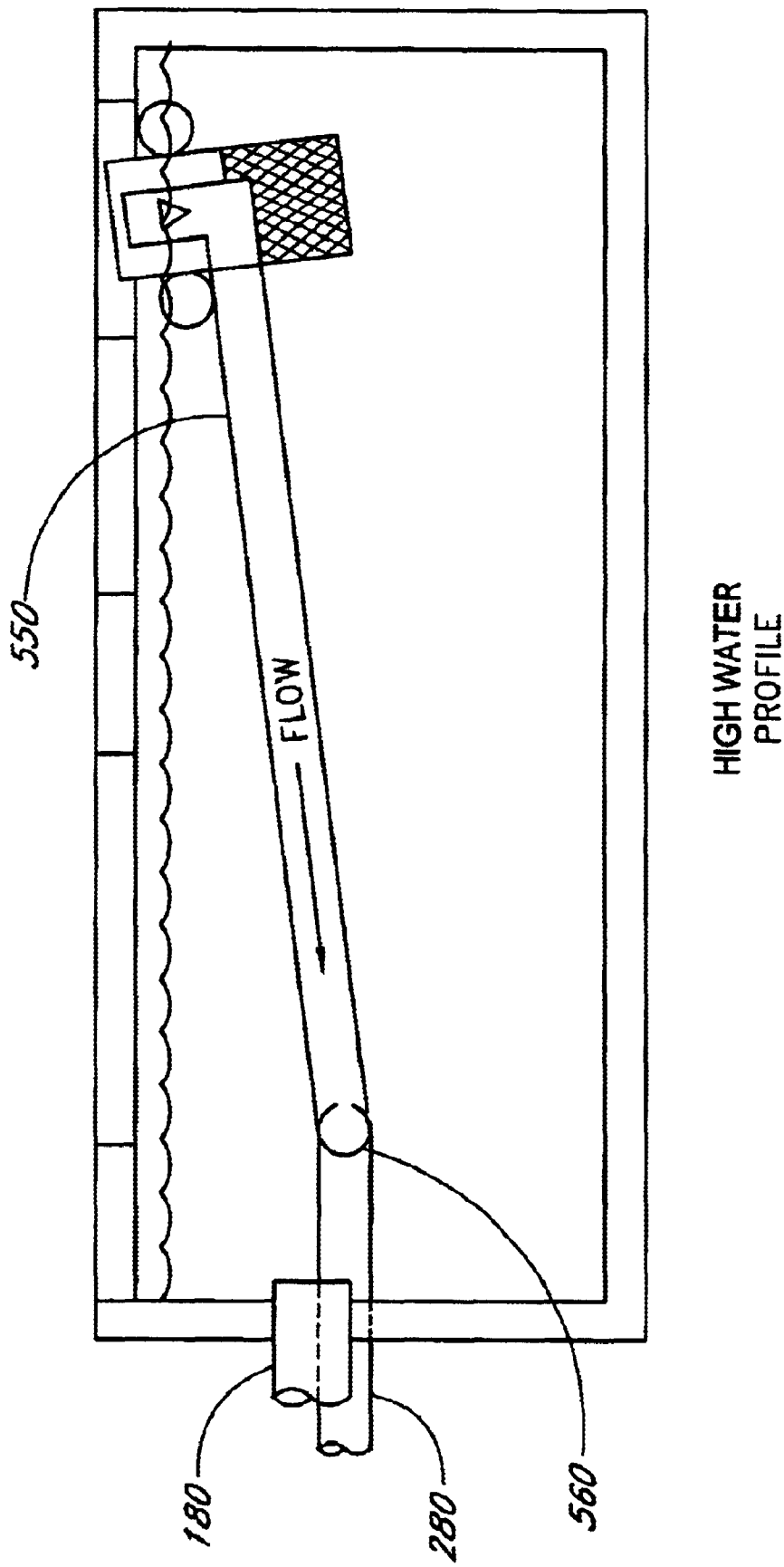
Figure 10C:
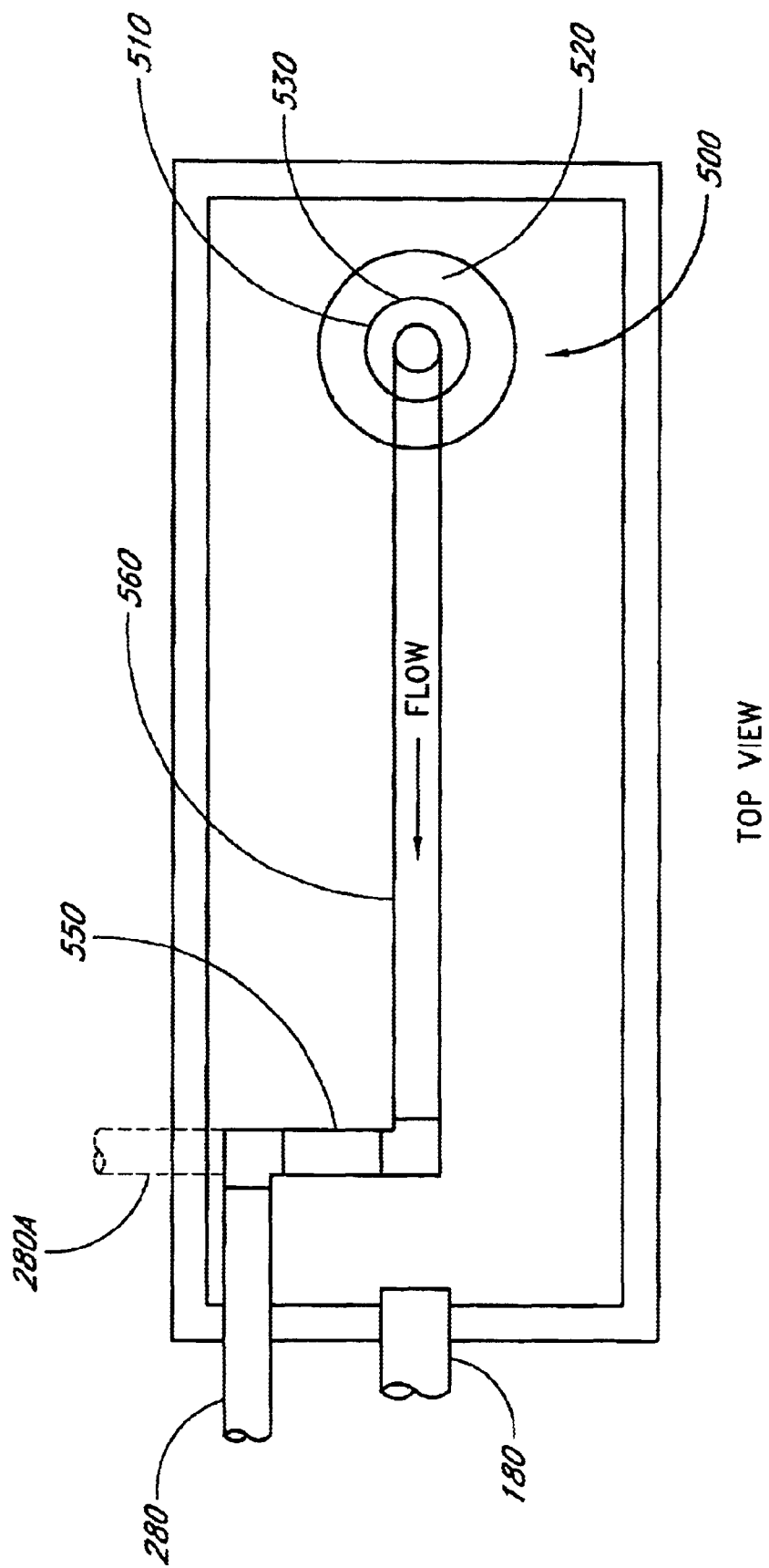

FIG. 10 provides an illustration of the apparatus, in one embodiment, incorporating a dynamic flow control orifice.

Unlike previous devices, the dynamic flow control orifice system 500 is a moveable orifice that differs from all other previous devices, as its primary purpose is to control the time for outflow of stormwater from said stormwater mitigation system, by maintaining a constant discharge rate throughout a majority of the discharge volume without utilizing any outside mechanical or electrical force or power. The dynamic flow control orifice system 500 does so by utilizing a properly sized and located orifice 510 within a buoyant floatation collar 520 protected from surface contamination via a solid shield 530 and from neutrally buoyant materials by a screen 540. A combination of gravity and buoyancy thus keeps the dynamic flow control orifice system at an advantageous position in the apparatus without outside influence, while the height of the orifice 510 is adjustable relative to the water surface by adjusting the vertical distance between the orifice 510 and the flotation collar 520. The vertical adjustment of the orifice 510 advantageously maintains the predetermined discharge flow rate through the great majority of retained capture volume. The action arm 550 is typically pivoted on a non-mechanical swing joint 560 to arc through the entire vertical range of the retained capture volume, and permits the orifice to move with the water level. By comparison, a fixed outlet orifice 280 as shown in FIG. 9, for example, typically does not move with the vault water level.

The preferred construction material for this component is synthetic hydrophobic material with non-corrosive fasteners, however, any suitable material such as plastic, fiberglass, and the like are to be considered included within the description and application of this apparatus. The simplified gravity dynamic flow control orifice described presently herein can advantageously be applied to any water treatment system, including the embodiments described herein and other systems known to artisans of ordinary skill in the art.

Figure 11A:
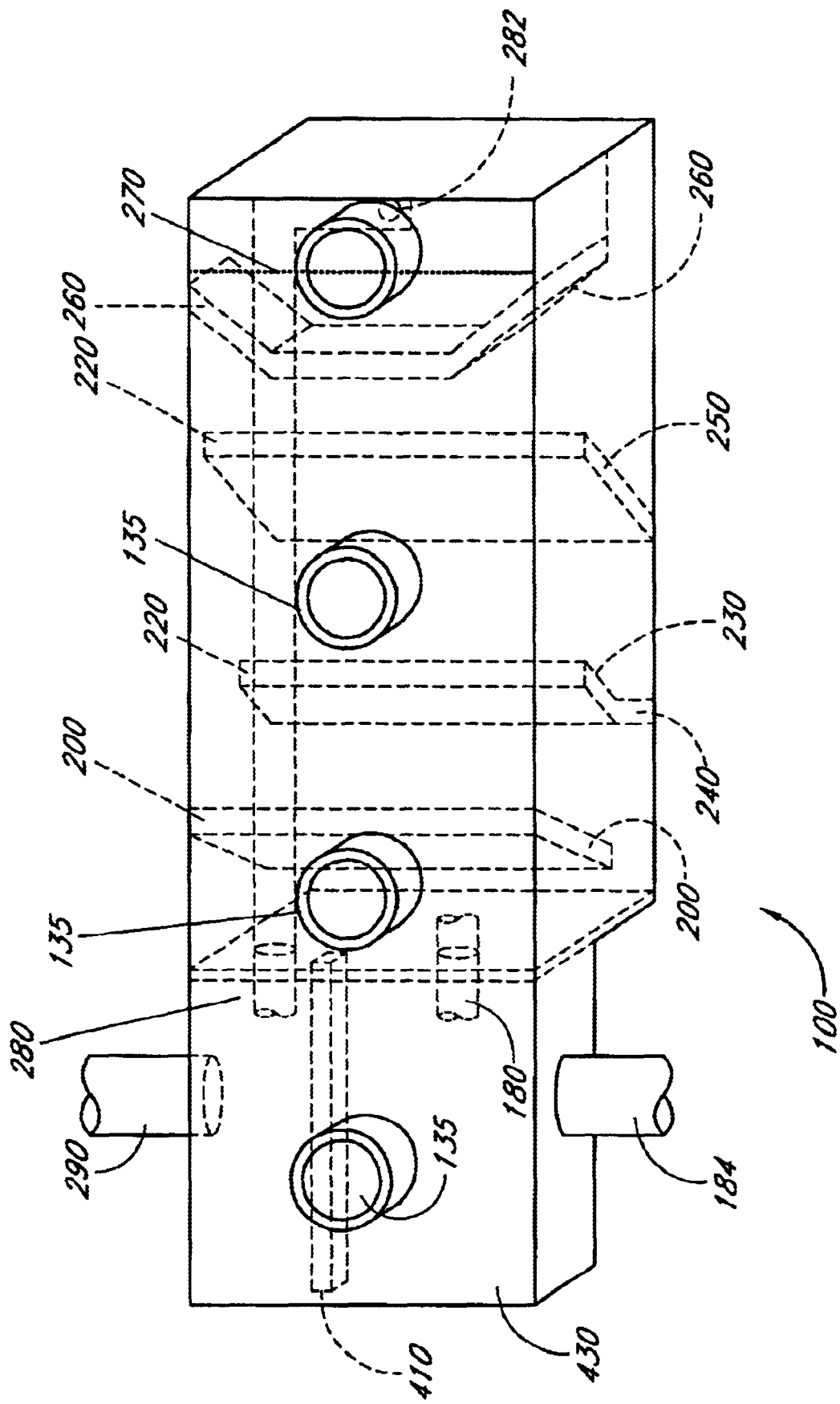
Figure 11B:
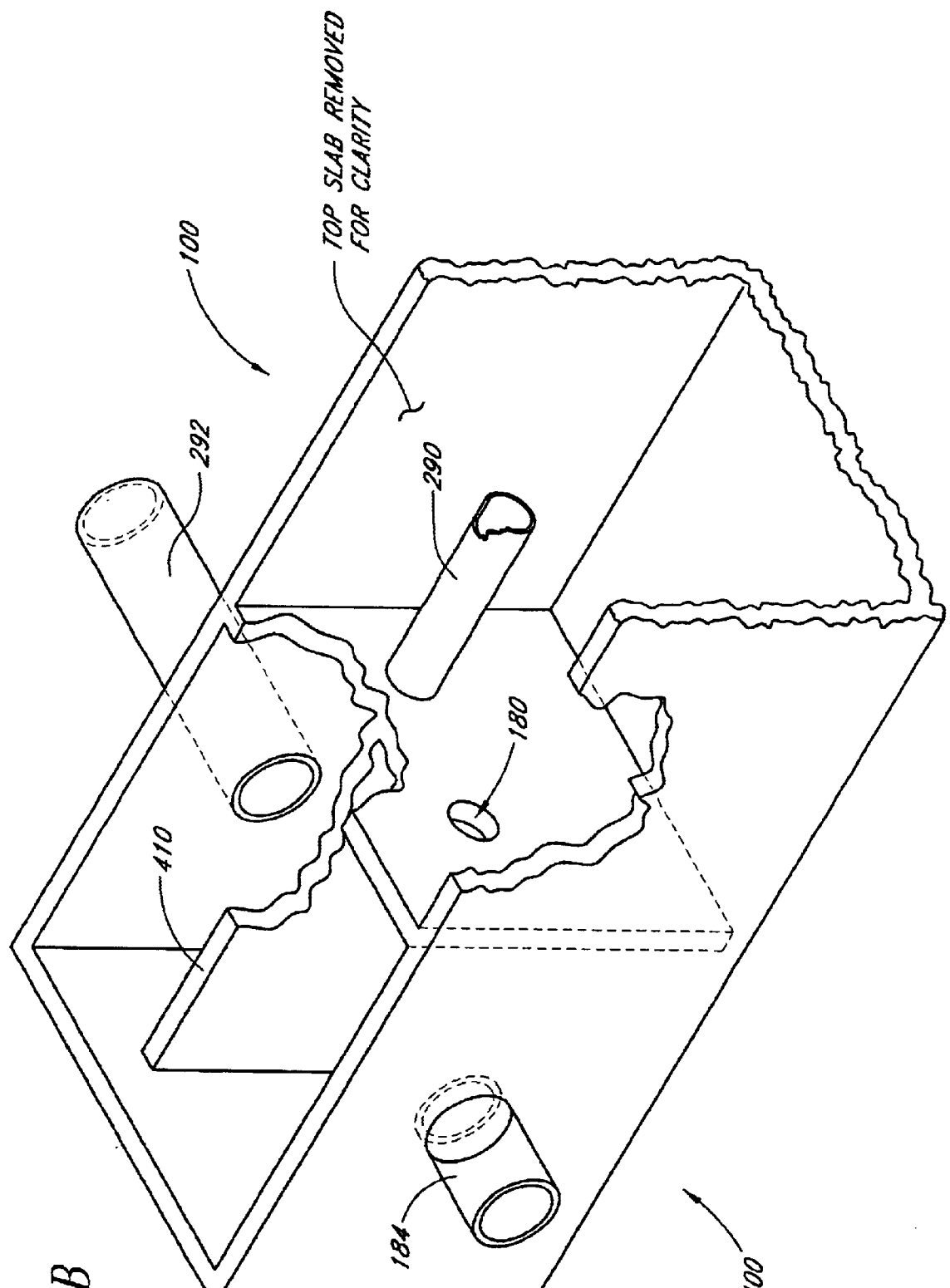

FIG. 11 provides a detailed plan view of the apparatus, in one embodiment, incorporating an integral overflow bypass structure. In one embodiment, this stormwater treatment apparatus is an integrated system whereby the above mentioned bypass manhole 400, volume control weir 410 and junction box 470 are combined and advantageously made integral within the confines of the stormwater treatment apparatus itself, as a typically unitary below grade modular precast concrete stormwater control and treatment device that is designed to manage and treat stormwater runoff by diverting the design water quality capture volume into the apparatus as a surcharged detention storage volume defined as the active pool and controlled release of said capture volume, with sediments stored in the permanent pool. The preferred construction material for all structural components is precast concrete however, any suitable material such as plastic, fiberglass, steel, cast in place concrete, and the like are applicable to this apparatus.

The integral bypass structure apparatus utilizes a novel, properly sized integral weir appurtenance 410 to divert the predetermined design capture volume water volume into the modular apparatus 100 from a stormwater collection system connected by, for example, a collection system inflow pipe 184. This capture of the capture volume is brought about by a integral volume control diversion weir 410 that directs the design runoff into the apparatus through the apparatus inflow pipe 180, with a minimum hydraulic loss into the apparatus 100. Any subsequent flow beyond that of the design capture volume is allowed to bypass the apparatus 100 via the integral volume control diversion weir 410 returning to the stormwater or runoff collection system or receiving waters through a collection system outflow pipe 292. Stormwater treated by the apparatus is returned via a discharge pipe 280 to the combination junction box 470/bypass manhole 400 for return to the stormwater or runoff collection system or receiving waters through the collection system outflow pipe 292.

In one embodiment the integral bypass system is preferably configured with the apparatus 100 aligned perpendicular to the collection stormdrain that is to be intercepted. The bypass headworks is advantageously configured to provide a minimum footprint, through integration of the bypass manhole 400 and junction box 470 with the entire apparatus, while allowing for a trash and debris collection assembly to be incorporated into the integrated apparatus treatment train. The size of the bypass headworks 400, junction 470 and integral weir 410 elevation relative to the apparatus is typically established by the maximum design flow rate in the collection stormdrain that is to be intercepted. The headworks size typically corresponds to the minimum required for the integral weir 410 size, location and materials of the stormdrain main and inflow pipes 184. Depending on the topography of the stormwater collection system for which the apparatus 100 is going to be connected, the position of the stormwater collection system inflow pipe 184 and stormwater collection system outflow pipe 292 may be advantageously altered and placed in different positions on the junction box 470/bypass manhole 400, as apparent to one of ordinary skill in the art, in order to minimize the footprint of the apparatus 100.

As would be apparent to one of ordinary skill in the art, the apparatus should typically be designed to withstand an AASHTO ("American Association of State Highway and Transportation Officials") or ASTM ("American Society for Testing and Materials") C 890 H-20 traffic loading with 1.0'–6.0' of earth cover. The apparatus is flexible and can be designed to withstand other anticipated loads as designated by the site engineer and specific site requirements.

To ensure acceptable hydraulic loading rates, promotion of settling and retention of pollutants, and enable proper maintenance, the minimum permanent pool liquid depth is typically between 1' to 3', or larger for large embodiments of the apparatus. To provide a minimum hydraulic loading ratio in order to promote the settling of particles from the stormwater flow, there is typically a minimum of approximately one square foot of surface area for about each about 60 gallons of total liquid capacity.

The apparatus typically has a minimum of three access openings for maintenance, preferably at the inlet section, center section, and outlet section, but the number of openings is foreseen to vary based on site requirements. Openings typically have a minimum clear opening of about 30" in diameter, and are typically located over each compartment of the apparatus. There typically is an additional access opening for every about 8' of interception length in the center section of the apparatus. In one embodiment, there typically is an additional access opening on the bypass manhole and outlet box.

The disclosed apparatus offers the designer and the developer a new degree of freedom in solving a large number of stormwater quality problem situations. Most existing structural stormwater treatment systems rely on a flow through rate calculation to size their technologies, thereby not fully considering the hydraulic or water quality impacts on the receiving waters. The method, as defined in "Urban Runoff Quality Management," WEF Manual of Practice No. 23, and ASCE Manual and Report on Engineering Practice No. 87, addresses these concerns. Those concerns have previously defied reasonable economical solutions using previously available structural stormwater mitigation systems, but are advantageously resolved by the present apparatus.

This method may also be modified, as known to artisans of ordinary skill, for example, to allow sizing of the capture volume using the mean runoff volume as defined, for instance, by Discroll, et al. 1989 and to accommodate an approximate recommended six hour drain down time.

The capture volume stacked water column provides the most efficient use of available system footprint. Owing to this feature, the apparatus typically requires a minimum of about three feet, and preferably about five feet, of vertical temporary water storage capacity, as apparent to artisans of ordinary skill. This temporary stacked water column is accomplished in the standard apparatus arrangements by use of a bypass weir sized to provide a minimum of backwater while insuring the full capture volume potential of the selected vault. Alternate system configurations accomplish the stacked water column configuration by providing the necessary vertical separation within the stormdrain piping system itself or by using a pumped system. These systems can use, for example, an external bypass, an internal bypass, a surface bypass, pumped discharge, and/or a bypass with a fall system.

As is typically known to those of skill in the art, the external apparatus "bypass with weir" configuration is advantageously with the vault aligned parallel to and offset approximately three feet clear from the collection stormdrain that is to be intercepted. The bypass manhole is, in one embodiment, located approximately eight feet up gradient from the apparatus influent. The size of the bypass manhole and weir elevation relative to the apparatus is typically established by the maximum design flow rate in the collection stormdrain that is to be intercepted.

For example, in one embodiment, as familiar to one of skill in the art, the influent pipe typically has a minimum of about 1% slope to the apparatus, and is preferably constructed of SDR-35 PVC. The influent pipe typically exits the bypass manhole at about 45 degrees to the stormdrain flowline with, in one embodiment, a ⅛-turn elbow located near the apparatus. The effluent pipe is typically about 8"

SDR 35 PVC and has a slope at about 1% from the apparatus to the junction box, sized equivalent to the bypass manhole. The orifice operating head is typically calculated from the vault soffit to the springline of the effluent pipe. Due to the fact that the apparatus operates with a surcharge water column, all pipe sizes and angles are based on smooth wall SDR 35 PVC pipe in order to advantageously provide a flexible watertight connections a all penetrations. However, other constructions are also useable based on specific site conditions and requirements, as known to artisans of ordinary skill in the art.

A junction box is, in one embodiment and as familiar to one of skill in the art, approximately parallel, approximately 3 feet clear from the collection stormdrain, and approximately 8 feet down gradient from the apparatus effluent. The size of the junction box is established by the design flow rate in the collection stormdrain, maximum pipe size penetrations and relative piping angles, and is similar to those typically used for the "bypass manhole."

The "bypass with fall" arrangement is similar to the standard configuration with regard to the bypass manhole, junction box and influent/effluent pipe sizes. However, the bypass manhole does not require a weir in this arrangement. The orifice operating head is calculated from the vault soffit to the springline of the effluent pipe.

The "pumped discharge" arrangement is also similar to the standard configuration with the bypass manhole, by-pass pipe elevation and junction box, except that the effluent is discharged through a duplex pump system uniquely designed to be contained within the apparatus or junction box.

The pump positive operating head is calculated from the vault soffit. The pump discharge rate is calculated based on the outflow rate form the apparatus.

The "surface by-pass" is unique in that because by definition the flowline of the storm drainage is on surface above the apparatus. The orifice operating head is calculated from the surface hydraulic grade line to the springline of the effluent pipe. While this arrangement does not require a dedicated bypass manhole or junction box it does require a drop inlet or catch basin at similar locations to the turning manholes as shown on the "overflow with weir" arrangement.

The preferred "standard internal bypass" configuration, as shown in FIG. 10, is with the vault aligned perpendicular to the collection stormdrain that is to be intercepted. The bypass headworks is so configured to provide a minimum footprint while allowing for a trash and debris collection assembly to be incorporated into the apparatus treatment train. The size of the bypass headworks and weir elevation relative to the apparatus shall be established by the maximum design flow rate in the collection stormdrain that is to be intercepted. The headworks size corresponds to the minimum required for the size, location and materials of the stormdrain main and influent pipes. The orifice operating head is calculated from the vault soffit to the springline of the effluent pipe.

The description given herein describes particular embodiments of the present apparatus, and other embodiments are foreseen and included herein and can be adapted by artisans of ordinary skill in the art, such that the present invention should be defined only by the following claims and equivalents thereof.

What is claimed is:

1. A stormwater treatment apparatus, comprising:
   a receptacle adapted to receive water flowing from a surface drainage area, comprising:
   the receptacle having a bottom wall and a top wall;
   an inlet, the inlet supplying water to the receptacle;
   an outlet, the outlet passing water out of the receptacle;
   the inlet and the outlet being in fluid communication with one another;
   a permanent pool, the permanent pool defined by at least the bottom wall of the receptacle, and extending upward from said bottom wall to the height of said outlet, the permanent pool forming a region of reduced flow velocity to trap sediments therein;
   an inactive pool, the inactive pool defined by at least the permanent pool, a first baffle extending from the bottom wall, a second baffle extending from the bottom wall, and the bottom wall of the receptacle; and
   an active pool, the active pool defined by at least the top wall of the receptacle, and extending downward from said top wall to at least the height of said outlet.

2. A stormwater treatment apparatus, comprising:
   a receptacle adapted to receive water flowing from a surface drainage area, comprising:
   the receptacle having a bottom wall and a top wall;
   an inlet, the inlet supplying water to the receptacle;
   an outlet, the outlet passing water out of the receptacle;
   the inlet and the outlet being in fluid communication with one another;
   a permanent pool, the permanent pool defined by at least the bottom wall of the receptacle, and extending upward from said bottom wall to the height of said outlet, the permanent pool forming a region of reduced flow velocity to trap sediments therein;
   an inactive pool, the inactive pool defined by at least the permanent pool, a first baffle extending from the bottom wall, a second baffle extending from the bottom wall, and the bottom wall of the receptacle; and
   an overflow structure, the overflow structure diverting excess stormwater from the receptacle, wherein the overflow structure includes a control weir and an apparatus inlet, and the overflow structure is integral with the receptacle.

3. The apparatus of claim 2, wherein the integral overflow structure includes a stormwater collection inflow pipe and a stormwater collection outflow pipe.

4. The apparatus of claim 2, wherein the integral overflow structure includes an apparatus outlet pipe, the apparatus outlet pipe returning water treated in the receptacle to the overflow structure.

5. The apparatus of claim 2, further comprising a bypass pipe, the control weir regulating the diversion of water to the bypass pipe.

6. A stormwater treatment apparatus, comprising:
   a receptacle adapted to receive water flowing from a surface drainage area, the receptacle having at least a top and a bottom;
   an inlet section, the inlet section supplying water to the receptacle;
   an outlet section, the outlet section passing water out of the receptacle;
   at least one mid section, the at least one mid section comprising a fluid communication between the inlet section and the outlet section;
   a permanent pool, the permanent pool defined by at least the bottom wall of the receptacle, and extending upward from said bottom wall to at least the height of said outlet; the permanent pool generally below the path of fluid communication; the permanent pool forming a region of reduced flow velocity to trap sediments therein;

an inactive pool, the inactive pool defined by at least the permanent pool, a first baffle extending from the bottom of the receptacle, a second baffle extending from the bottom of the receptacle, and the bottom of the receptacle, wherein at least a first portion of the first baffle is at an angle of between about thirty degrees and about sixty degrees with the bottom of the receptacle and at least a second portion of the first baffle is at an angle of roughly ninety degrees with the bottom of the receptacle.

7. A stormwater treatment apparatus, comprising:

a receptacle adapted to receive water flowing from a surface drainage area, the receptacle having at least a top and a bottom;

an inlet section, the inlet section supplying water to the receptacle;

an outlet section, the outlet section passing water out of the receptacle;

at least one mid section, the at least one mid section comprising a fluid communication between the inlet section and the outlet section;

a permanent pool, the permanent pool defined by at least the bottom wall of the receptacle, and extending upward from said bottom wall to at least the height of said outlet; the permanent pool generally below the path of fluid communication; the permanent pool forming a region of reduced flow velocity to trap sediments therein; and an inactive pool, the inactive pool defined by at least the permanent pool, a first baffle extending from the bottom of the receptacle, a second baffle extending from the bottom of the receptacle, and the bottom of the receptacle, wherein at least a first portion of the second baffle is at an angle of between thirty degrees and sixty degrees with the bottom of the receptacle, and at least a second portion of the second baffle is at an angle of roughly ninety degrees with the bottom of the receptacle.

8. A stormwater treatment apparatus, comprising:

a receptacle adapted to receive water flowing from a surface drainage area, the receptacle having at least a top and a bottom;

an inlet section, the inlet section supplying water to the receptacle;

an outlet section, the outlet section passing water out of the receptacle;

at least one mid section, the at least one mid section comprising a fluid communication between the inlet section and the outlet section;

a permanent pool, the permanent pool defined by at least the bottom wall of the receptacle, and extending upward from said bottom wall to at least the height of said outlet; the permanent pool generally below the path of fluid communication; the permanent pool forming a region of reduced flow velocity to trap sediments therein;

an inactive pool, the inactive pool defined by at least the permanent pool, a first baffle extending from the bottom of the receptacle, a second baffle extending from the bottom of the receptacle, and the bottom of the receptacle;

a third baffle, the third baffle near said inlet, the third baffle extending down from the top wall of the receptacle; and, a fourth baffle, the fourth baffle near said outlet, the fourth baffle extending down from the top wall of the receptacle.

9. A stormwater treatment apparatus, comprising:

a receptacle adapted to receive water flowing from a surface drainage area;

the receptacle having a bottom, a top, and a perimeter;

the receptacle having an inlet and an outlet;

the inlet and the outlet being in fluid communication with one another;

an active pool, the active pool defined by at least the top wall of the receptacle, the perimeter of the receptacle, and extending downward from said top wall to at least the height of said outlet, the active pool a region of fluid communication between the inlet and the outlet;

a permanent pool, the permanent pool a region of little or no flow gravitationally beneath the active pool to trap sediments therein; and the outlet includes an overflow structure, said overflow structure diverting excess stormwater from said receptacle when said receptacle is at or near full the overflow structure not substantially affecting the performance of the active pool, the overflow structure includes an apparatus outlet pipe, the apparatus outlet pipe returning water treated in the receptacle to the overflow structure.

10. A stormwater treatment apparatus, comprising:

a receptacle adapted to receive water flowing from a surface drainage area;

the receptacle having a bottom, a top, and a perimeter;

the receptacle having an inlet and an outlet, the outlet including an oriface smaller than the inlet, the receptacle having an inlet, the inlet including an integral overflow structure, said overflow structure diverting excess stormwater from said receptacle when said receptacle is at or near full;

the inlet and the outlet being in fluid communication with one another;

an active pool, the active pool is a region defined by the top of the receptacle, the sides of the receptacle, and at least the height of the outlet;

a permanent pool, the permanent pool a region of little or no flow beneath the active pool to trap at least small sediments therein; and, an inactive pool, the inactive pool a region defined by the permanent pool, at least a first baffle attached to the bottom of the receptacle, a second baffle attached to the bottom of the receptacle, the sides of the receptacle, and the bottom of the receptacle.

11. The apparatus of claim 10, wherein at least a first portion of the second baffle is at an angle of between thirty degrees and sixty degrees with the bottom of the receptacle.

12. The apparatus of claim 10, wherein at least a first portion of the first baffle is at an angle of about forty-five degrees with the bottom of the receptacle.

13. The apparatus of claim 10, wherein at least a first portion of the second baffle is at an angle of about forty-five degrees with the bottom of the receptacle.

14. The apparatus of claim 12, wherein at least a second portion of the first baffle is at an angle of roughly ninety degrees with the bottom of the receptacle.

15. The apparatus of claim 13, wherein at least a second portion of the second baffle is at an angle of roughly ninety degrees with the bottom of the receptacle.

16. The apparatus of claim 10, wherein the apparatus has a volume of at least 500 cubic feet.

17. An apparatus for separation of pollutants in runoff that are less and more dense than the runoff water, comprising:

a receptacle adapted to receive stormwater runoff flowing from surface areas tributary to it, the receptacle having a bottom and a top, a left side-wall and a right side-wall, and a front side-wall and end side-wall, forming a rectangular tank;

an inlet for introducing stormwater flowing from tributary surface areas into the receptacle and an outlet for discharging water;

at least four baffles positioned within the receptacle between the inlet and the outlet, with all of the baffles attached to both sides of the receptacle, with at least two baffles attached to the bottom of the receptacle and not attached to the top, at least one baffle attached to the top of the receptacle and not attached to the bottom, and at least one baffle that is not attached to the bottom and top of the receptacle;

an inlet section for receiving water, for decreasing energy of the flowing water, and for uniformly distributing water across the width of the receptacle;

one or more midsections for trapping materials more dense than water that settle out of water by gravity and for trapping materials less dense than water that rise to the surface of water by gravitational separation;

an outlet section for discharging water at a controlled rate and for excluding materials more and less dense than water being discharged, the outlet section including an opening located on the end side-wall that allows water in the apparatus to discharge, the outlet substantially smaller than the inlet;

a mesh screening, the mesh screening from the bottom to the top of the apparatus is attached in a removable fashion to the end side-wall to form a barrier through which any water that discharges through the opening must pass prior to discharge;

an overflow structure, the overflow structure diverting excess stormwater flow from the receptacle, the overflow structure integral with the receptacle;

an active pool, the active pool defined by at least the top wall of the receptacle, and extending downward from said top wall to at least the height of said outlet opening;

a permanent pool, the permanent pool defined by at least the bottom wall of the receptacle, and extending upward to at least the height of said outlet opening; and, an inactive pool, the inactive pool defined by at least the permanent pool, the bottom of the receptacle, and the at least two baffles attached to the bottom of the receptacle.

18. A stormwater treatment apparatus, comprising:

a receptacle having a top, a bottom, a left side wall and a right side wall, an inlet side wall and an outlet end wall, said receptacle comprising an inlet section, an outlet section and at least one midsection between said inlet section and said outlet section;

an inlet located in said inlet section, spaced above said bottom;

an outlet located in said outlet section spaced above said bottom, said outlet height defining a permanent pool water surface elevation level;

a first baffle having an upstream side and a downstream side, said first baffle connected to said bottom and extending upward no higher than said permanent pool water surface elevation level, said upstream side of said first baffle including at least a portion angled upward from said bottom and towards said outlet;

a second baffle between said first baffle and said outlet having an upstream side and a downstream side, said second baffle connected to said bottom and extending upward no higher than said permanent pool water surface elevation level, said upstream side of said second baffle including at least a portion angled upward from said bottom and toward said outlet;

an active pool, said active pool defined by said inlet, said outlet, and said top of said receptacle; and, a permanent pool, said permanent pool defined by said first baffle, said second baffle, said left side wall, said right side wall, and said permanent pool water surface elevation level, said permanent pool generally gravitationally below said active pool.

* * * * *